United States Patent
Ramasubramonian et al.

(10) Patent No.: US 11,259,023 B2
(45) Date of Patent: Feb. 22, 2022

(54) HARMONIZATION OF TRANSFORM-BASED QUANTIZATION AND DYNAMIC RANGE ADJUSTMENT SCALE DERIVATION IN VIDEO CODING

(71) Applicant: QUALCOMM Incorporated, San Diego, CA (US)

(72) Inventors: Adarsh Krishnan Ramasubramonian, Irvine, CA (US); Dmytro Rusanovskyy, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/380,520

(22) Filed: Apr. 10, 2019

(65) Prior Publication Data
US 2019/0320174 A1 Oct. 17, 2019

Related U.S. Application Data

(60) Provisional application No. 62/656,936, filed on Apr. 12, 2018.

(51) Int. Cl.
*H04N 19/186* (2014.01)
*H04N 19/126* (2014.01)
(Continued)

(52) U.S. Cl.
CPC .......... *H04N 19/124* (2014.11); *G06T 5/009* (2013.01); *G06T 5/50* (2013.01); *H04N 19/136* (2014.11);
(Continued)

(58) Field of Classification Search
CPC .... H04N 19/176; H04N 19/86; H04N 19/149; H04N 19/136; H04N 19/172;
(Continued)

(56) References Cited

U.S. PATENT DOCUMENTS

| 2013/0188693 | A1* | 7/2013 | Xu | .......................... H04N 19/13 375/240.03 |
|---|---|---|---|---|
| 2014/0003498 | A1 | 1/2014 | Sullivan | |

(Continued)

FOREIGN PATENT DOCUMENTS

| CN | 104427339 A | 3/2015 |
|---|---|---|
| CN | 104584560 A | 4/2015 |

(Continued)

OTHER PUBLICATIONS

Andersson K., et al., "Report for CE1.a (Chroma QP)", 113. MPEG Meeting; Oct. 19, 2015-Oct. 23, 2015; Geneva; (Motion Picture Expert Group or ISO/IEC JTC1/SC29/WG11), No. m37179, Oct. 13, 2015 (Oct. 13, 2015), 6 Pages, XP030065547, the whole document.

(Continued)

*Primary Examiner* — Albert Kir
(74) *Attorney, Agent, or Firm* — Shumaker & Sieffert, P.A.

(57) ABSTRACT

Techniques for decoding video data include determining a picture quantization parameter (QP) value of the picture of video data, determining an intermediate chroma QP offset value for a chroma QP value based on the picture QP value and a first function based on video characteristics of the picture of video data, determining the chroma QP value with a second function of the intermediate chroma QP offset value, and decoding the picture of video data using the chroma QP value.

30 Claims, 15 Drawing Sheets

(51) Int. Cl.

| | |
|---|---|
| *H04N 19/124* | (2014.01) |
| *H04N 19/136* | (2014.01) |
| *H04N 19/172* | (2014.01) |
| *H04N 19/196* | (2014.01) |
| *H04N 19/70* | (2014.01) |
| *G06T 5/00* | (2006.01) |
| *G06T 5/50* | (2006.01) |

(52) U.S. Cl.
CPC ......... *H04N 19/172* (2014.11); *H04N 19/186* (2014.11); *H04N 19/196* (2014.11); *H04N 19/70* (2014.11); *G06T 2207/10016* (2013.01); *G06T 2207/20208* (2013.01)

(58) Field of Classification Search
CPC .... H04N 19/12; H04N 19/124; H04N 19/186; H04N 19/196; H04N 19/70; G06T 5/009; G06T 5/50; G06T 2207/10016; G06T 2207/20208
USPC .................................... 375/240.03; 382/251
See application file for complete search history.

(56) References Cited

U.S. PATENT DOCUMENTS

| | | | | |
|---|---|---|---|---|
| 2015/0063460 | A1* | 3/2015 | Gamei | H04N 19/186 375/240.18 |
| 2015/0071344 | A1* | 3/2015 | Tourapis | H04N 19/86 375/240.03 |
| 2015/0264354 | A1 | 9/2015 | Zhang et al. | |
| 2015/0271497 | A1* | 9/2015 | Unno | H04N 19/176 382/251 |
| 2016/0366422 | A1* | 12/2016 | Yin | H04L 43/16 |
| 2018/0048901 | A1* | 2/2018 | Zhang | H04N 19/124 |
| 2018/0278934 | A1* | 9/2018 | Andersson | H04N 19/186 |
| 2019/0098317 | A1* | 3/2019 | Lu | H04N 19/149 |
| 2021/0152830 | A1* | 5/2021 | Bossen | H04N 19/119 |

FOREIGN PATENT DOCUMENTS

| | | |
|---|---|---|
| CN | 104756497 A | 7/2015 |
| WO | 2017184784 A1 | 10/2017 |

OTHER PUBLICATIONS

Bross B., et al., "High Efficiency Video Coding (HEVC) Text Specification Draft 7", 9. JCT-VC Meeting; 100. MPEG Meeting; Apr. 27, 2012-May 7, 2012; Geneva; (Joint Collaborative Team on Video Coding of ISO/IEC JTC1/SC29/WG11 and ITU-T SG.16); URL: http://wftp3.itu.int/av-arch/jctvc-site/, No. JCTVC-I1003_d0, May 10, 2012, 270 Pages, XP030112373.

International Search Report and Written Opinion—PCT/US2019/026966—ISA/EPO—dated Sep. 4, 2019.

Partial International Search Report—PCT/US2019/026966—ISA/EPO—dated Jul. 10, 2019.

Chen J., et al., "Algorithm Description of Joint Exploration Test Model 1," Joint Video Exploration Team (JVET) of ITU-T SG16 WP3 and ISO/IEC JTC1/SC29/WG11, 1nd Meeting: Geneva, CH, Oct. 19-21, 2015, JVET-A1001, 27 pp.

ITU-T H.265, Series H: Audiovisual and Multimedia Systems, Infrastructure of audiovisual services—Coding of moving video, Advanced video coding for generic audiovisual services, The International Telecommunication Union. Dec. 2016, 664 pp.

IEEE Std 802.11 ad-2012: "Part 11: Wireless LAN Medium Access Control (MAC) and Physical Layer (PHY) Specifications—Amendment 3: Enhancements for Very High Throughput in the 60 GHz Band", LAN/MAN Standards Committee of the IEEE Computer Society, Dec. 28, 2012, 628 Pages.

Ergen S., "ZigBee/IEEE 802.15.4 Summary", Sep. 10, 2004, 37 pp.

Bross B., et al., "Versatile Video Coding (Draft 4)", Joint Video Experts Team (JVET) of ITU-T SG 16 WP 3 and ISO/IEC JTC 1/SC 29/WG 11, 13th Meeting: Marrakech, MA, Jan. 9-18, 2019, JVET-M1001-v5, 287 pages.

ITU-T H.223, Series H: Audiovisual and Multimedia Systems, Infrastructure of Audiovisual Services—Transmission Multiplexing and Synchronization, Multiplexing Protocol for Low Bit Rate Multimedia Communication, The International Telecommunication Union, Jul. 2001, 74 pp.

ITU-R Recommendation BT.709-6, "Parameter values for the HDTV standards for production and international programme exchange," Jun. 2015, pp. 1-17.

ITU-R Recommendation BT.2020-2, "Parameter values for ultra-high definition television systems for production and International programme exchange," Oct. 2015, 8 pp.

ITU-R Recommendation BT.2100-2, "Image parameter values for high dynamic range television for use in production and international programme exchange," Jul. 2018, 16 pages.

SMPTE Standard, "High Dynamic Range Electro-Optical Transfer Function of Mastering Reference Displays", SMPTE ST 2084:2014, The Society of Motion Picture and Television Engineers, Aug. 16, 2014, XP055225088, 14 pp, ISBN: 978-1-61482-829-7.

SMPTE Standard for Motion-Picture Film {8-mm TypeR)—Camera Aperture Image and Usage, SMPTE 231-2004, Nov. 8, 2004, 4 pp.

Qualcomm Inc., "Dynamic Range Adjustment SEI to Enable High Dynamic Range Video Coding with Backward-Compatible Capability," International Telecommunication Union, Study Group 16, No. COM 16-C 1027-E, ITU-T, Sep. 2015, XP030100746, pp. 1-11.

Ramasubramonian A.K., "HDR CE2.a-1: Report on LCS", Joint Collaborative Team on Video Coding (JCT-VC) of ITU-T SG 16 WP 3 and ISO/IEC JTC 1/SC 29/WG 11, 23rd Meeting: San Diego, USA, Feb. 19-26, 2016, No. JCTVC-W0101r1, 7 pages.

Schwarz H., et al., "Hierarchical B Pictures", 16th JVT Meeting; 73. MPEG Meeting; Jul. 24, 2005-Jul. 29, 2005; Poznan,PL; (Joint Video Team of ISO/IEC JTC1/SC29/WG11 and ITU-T SG.16 ),, No. JVT-P014, Jul. 19, 2005 (Jul. 19, 2005), XP030006056, 25 pages.

* cited by examiner

Example of EOTFs

| QP. | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 |
|---|---|---|---|---|---|---|---|---|---|---|---|---|---|---|---|---|---|---|---|---|---|---|---|---|---|---|---|---|---|---|
| TableQP(qp) | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 |

| QP. | 30 | 31 | 32 | 33 | 34 | 35 | 36 | 37 | 38 | 39 | 40 | 41 | 42 | 43 | 44 | 45 | 46 | 47 | 48 | 49 | 50 | 51 | 52 | 53 | 54 | 55 | 56 | 57 |
|---|---|---|---|---|---|---|---|---|---|---|---|---|---|---|---|---|---|---|---|---|---|---|---|---|---|---|---|---|
| TableQP(qp) | 29 | 30 | 31 | 32 | 33 | 34 | 35 | 36 | 37 | 38 | 39 | 40 | 41 | 42 | 43 | 44 | 45 | 46 | 47 | 48 | 49 | 50 | 51 | 52 | 53 | 54 | 55 | 56 |

HARMONIZATION OF TRANSFORM-BASED QUANTIZATION AND DYNAMIC RANGE ADJUSTMENT SCALE DERIVATION IN VIDEO CODING

This application claims the benefit of U.S. Provisional Application No. 62/656,936, filed Apr. 12, 2018, the entire content of which is incorporated by reference herein.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard, ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

This disclosure is related to the field of coding of video signals with High Dynamic Range (HDR) and Wide Color Gamut (WCG) representations. More specifically, the current disclosure describes signaling and operations applied to video data in certain color spaces to enable more efficient compression of HDR and WCG video data.

In particular, the disclosure describes methods and devices configured to determine chroma quantization parameters for pictures of video data based on characteristics of the video data (e.g., color gamut) and a luma quantization parameter. The techniques of this disclosure may be used in conjunction with dynamic range adjustment techniques to achieve improved video coding efficiency with fewer visual artifacts when coding HDR and/or WCG content.

In one example, this disclosure describes a method of decoding a picture of video data, the method comprising determining a picture quantization parameter (QP) value of the picture of video data, determining an intermediate chroma QP offset value for a chroma QP value using the picture QP value and a first function based on video characteristics of the picture of video data, determining the chroma QP value with a second function of the intermediate chroma QP offset value, and decoding the picture of video data using the chroma QP value to produce a decoded picture.

In another example, this disclosure describes an apparatus configured to decode video data, the apparatus comprising a memory configured to store a picture of video data, and one or more processors in communication with the memory, the one or more processors configured to determine a picture QP value of the picture of video data, determine an intermediate chroma QP offset value for a chroma QP value using the picture QP value and a first function based on video characteristics of the picture of video data, determine the chroma QP value with a second function of the intermediate chroma QP offset value, and decode the picture of video data using the chroma QP value to produce a decoded picture.

In one example, this disclosure describes an apparatus configured to decode video data, the apparatus comprising means for determining a picture QP value of the picture of video data, means for determining an intermediate chroma QP offset value for a chroma QP value using the picture QP value and a first function based on video characteristics of the picture of video data, means for determining the chroma QP value with a second function of the intermediate chroma QP offset value, and means for decoding the picture of video data using the chroma QP value to produce a decoded picture.

In one example, this disclosure describes a computer-readable storage medium storing instructions that, when executed, cause one or more processors of a device configured to decode video data to determine a picture QP value of the picture of video data, determine an intermediate chroma QP offset value for a chroma QP value using the picture QP value and a first function based on video characteristics of the picture of video data, determine the chroma QP value with a second function of the intermediate chroma QP offset value, and decode the picture of video data using the chroma QP value to produce a decoded picture.

The details of one or more examples are set forth in the accompanying drawings and the description below. Other features, objects, and advantages will be apparent from the description, drawings, and claims.

BRIEF DESCRIPTION OF DRAWINGS

FIG. 13 is another example table for use with the techniques of this disclosure.

DETAILED DESCRIPTION

Compared to standard dynamic range (SDR) content, it has been observed that chroma artifacts are more visible in high dynamic range (HDR) content when encoding with techniques that are similar to SDR coding. For example, more chroma artifacts may be visible in bright regions of the image. Signalling a chroma quantization parameter (QP) offset that is a function of the base QP parameter for luma components is one way of reducing the impact of chroma artifacts that may be produced by these techniques.

Another technique to reduce chroma artifacts is to scale the chroma samples (e.g., using a dynamic range adjustment (DRA) process) to reflect the chroma QP offset term (e.g., chroma offset value), thereby potentially improving the overall coding of the chroma samples. However, QP cascading (coding different pictures of the video with different QPs) affects the chroma QP offset signalled for the pictures. Using a single chroma QP offset value for all the pictures in a sequence results in fewer matched chroma QP offsets being applied to different pictures in the sequences, thereby affecting the viewing experience. Signalling of chroma QP offset values for a picture would result in additional bits to be signalled, thereby affecting the coding performance. If chroma DRA scaling is applied to each picture based on the QP associated with the picture, then the chroma DRA parameters are signalled for each picture, which also results in more bits.

This disclosure describes several techniques that may improve dynamic range adjustment over multiple pictures and the integration of dynamic range adjustment with hybrid, transform-based video codecs (e.g., H.264/AVC, H.265/HEVC), including signaling. A hybrid, transform-based video codec is a video codec that uses inter and intra prediction together with transform coding. The techniques of this disclosure may reduce the presence and visibility of chroma artifacts in decoded video data, while also maintaining acceptable coding efficiency in terms of bitrate.

Figure 1:
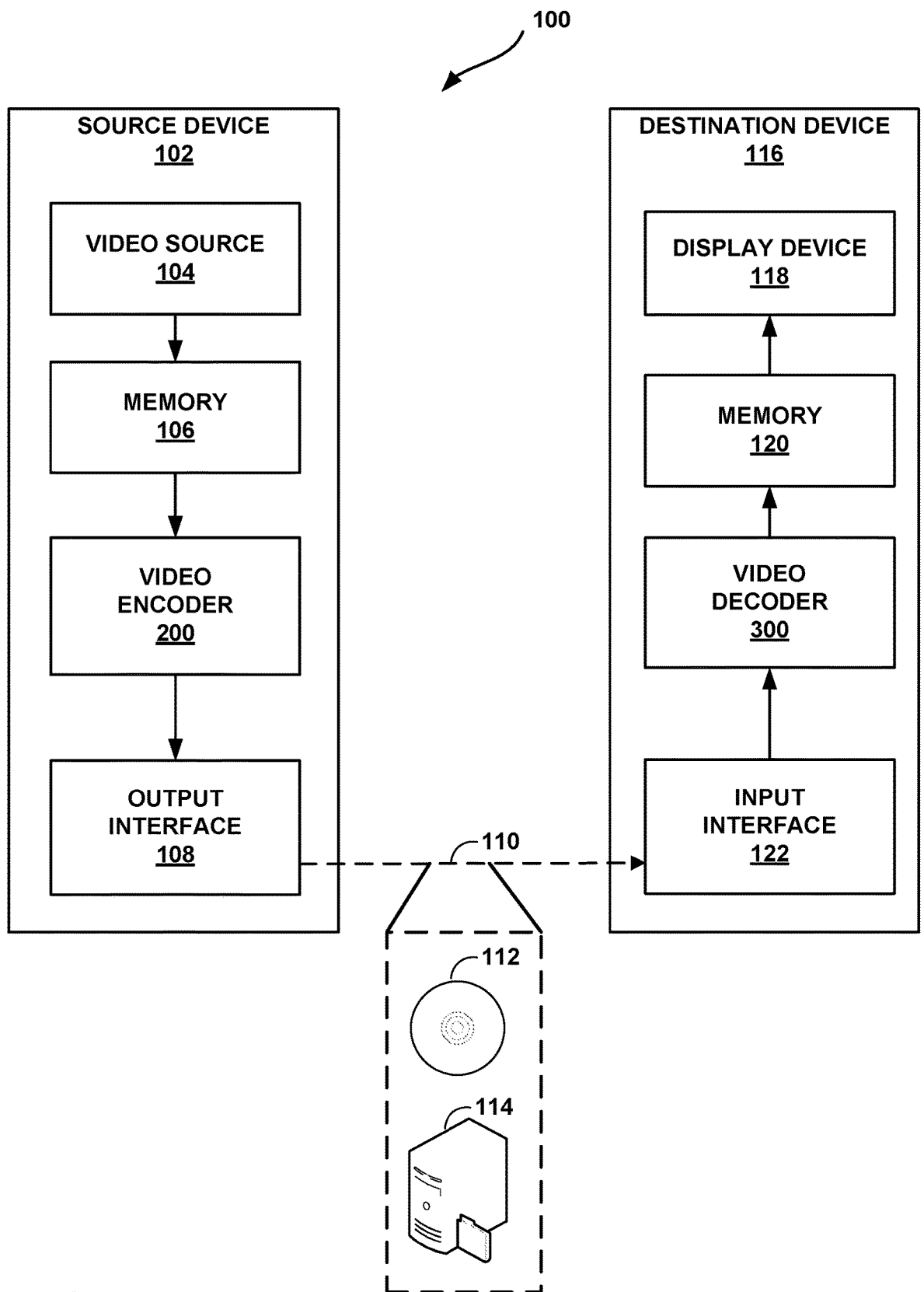
FIG. 1 is a block diagram illustrating an example video encoding and decoding system that may perform the techniques of this disclosure.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, uncoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may be any of a wide range of devices, including desktop computers, notebook (i.e., laptop) computers, tablet computers, set-top boxes, telephone handsets such as smartphones, televisions, cameras, display devices, digital media players, video gaming consoles, video streaming devices, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for dynamic range adjustment. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than including an integrated display device.

System 100 as shown in FIG. 1 is merely one example. In general, any digital video encoding and/or decoding device may perform techniques for dynamic range adjustment. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, devices 102, 116 may operate in a substantially symmetrical manner such that each of devices 102, 116 include video encoding and decoding components. Hence, system 100 may support one-way or two-way video transmission between video devices 102, 116, e.g., for video streaming, video playback, video broadcasting, or video telephony.

In general, video source 104 represents a source of video data (i.e., raw, uncoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some example, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may modulate the received transmission signal, according to a communication standard, such as a wireless communication protocol. The communication medium may be any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 116. Similarly, destination device 116 may access encoded data from storage device 116 via input interface 122. Storage device 116 may include any of a variety of distributed or locally accessed data storage media such as a hard drive, Blu-ray Disc®, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a File Transfer Protocol (FTP) server, a content delivery network device, or a network attached storage (NAS) device. Destination device 116 may access encoded video data from file server 114 through any standard data connection, including an Internet connection. This may include a wireless channel (e.g., a Wi-Fi connection), a wired connection (e.g., DSL, cable modem, etc.), or a combination of both that is suitable for accessing encoded video data stored on file server 114. File server 114 and input interface 122 may be configured to operate according to a streaming transmission protocol, a download transmission protocol, or a combination thereof.

Output interface 108 and input interface 122 may represent wireless transmitters/receiver, modems, wired networking components (e.g., Ethernet cards), wireless communication components that operate according to any of a variety of IEEE 802.11 standards, or other physical components. In examples where output interface 108 and input interface 122 include wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 is a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., storage device 112, file server 114, or the like). The encoded video bitstream computer-readable medium 110 may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may include an integrated circuit, a microprocessor, and/or a wireless communication device, such as a cellular telephone.

As will be explained in more detail below, video encoder 200 and video decoder 300 may be configured to determine quantization parameters for chroma components of a picture of video data in a manner that reduces chroma artifacts in HDR and WCG video data. For example, video encoder 200 and video decoder 300 may be configured to determine a base quantization parameter (QP) value of the picture of video data, determine an intermediate chroma QP offset value for a chroma QP value based on the base QP value and a lookup table from multiple lookup tables, where the lookup table is based on video characteristics of the picture of video data, determine the chroma QP value as a function of the intermediate chroma QP offset value, and code (e.g., encode or decoder) the picture of video data using the chroma QP value.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as the Joint Exploration Test Model (JEM) or ITU-T H.266, also referred to as Versatile Video Coding (VVC). A recent draft of the VVC standard is described in Bross, et al. "Versatile Video Coding (Draft 4)," Joint Video Experts Team (WET) of ITU-T SG 16 WP 3 and ISO/IEC JTC 1/SC 29/WG 11, 13$^{th}$ Meeting: Marrakech, Mass., 9-18 Jan. 2019, JVET-M1001 (hereinafter "VVC Draft 4). The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to JEM or VVC. According to JEM or VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) partitions. A triple tree partition is a partition where a block is split into three sub-blocks. In some examples, a triple tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU has 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may include N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of JEM and VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of JEM and VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the coefficients, providing further compression. By performing the quantization process, video encoder 200 may reduce the bit depth associated with some or all of the coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

In accordance with the techniques of this disclosure, video encoder 200 and/or video decoder 300 may be configured to derive one or more intermediate values from an input quantization parameter (QP) value or an input scale value and one or more sets of parameters, and derive an output QP value or a DRA parameter from the one or more intermediate values.

In another example, as will be explained in more detail below, video encoder 200 and video decoder 300 may be configured to determine a picture quantization parameter (QP) value of the picture of video data, determine an intermediate chroma QP offset value for a chroma QP value using the picture QP value and a first function based on video characteristics of the picture of video data, determine the chroma QP value with a second function of the intermediate chroma QP offset value, and encode or decode the picture of video data using the chroma QP value to produce an encoded or decoded picture This disclosure may generally refer to "signaling" certain information, such as syntax elements. The term "signaling" may generally refer to the communication of values of syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 2A:
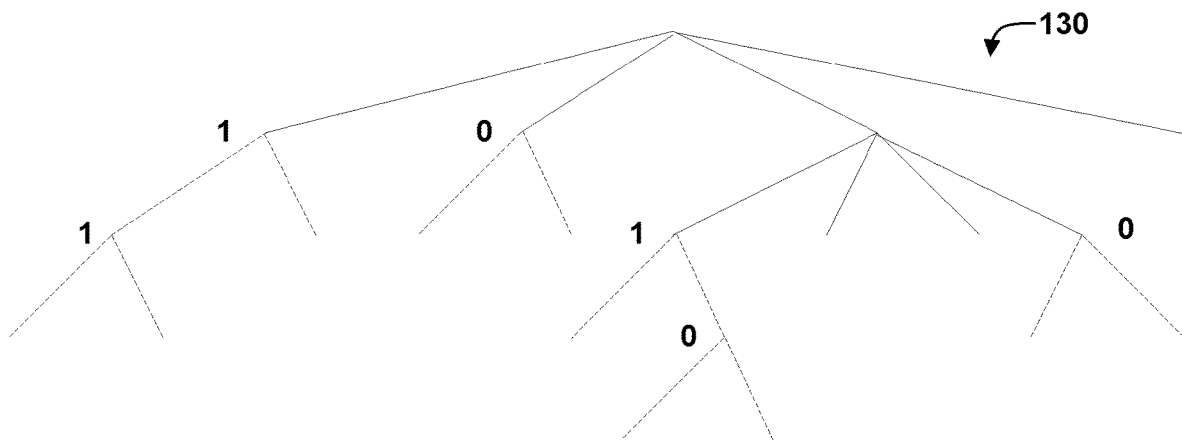
FIGS. 2A and 2B are conceptual diagrams illustrating an example quadtree binary tree (QTBT) structure, and a corresponding coding tree unit (CTU).
Figure 2B:
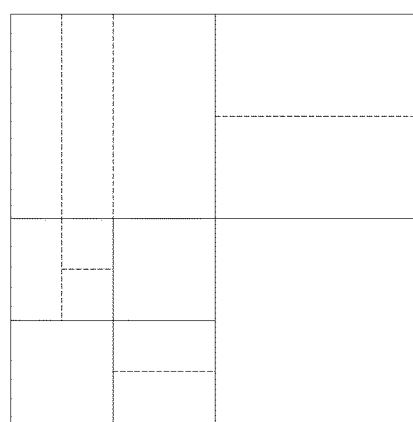

FIGS. 2A and 2B are conceptual diagrams illustrating an example quadtree binary tree (QTBT) structure 130, and a corresponding coding tree unit (CTU) 132. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example.

For the quadtree splitting, there is no need to indicate the splitting type, since quadtree nodes split a block horizontally and vertically into 4 sub-blocks with equal size. Accordingly, video encoder 200 may encode, and video decoder 300 may decode, syntax elements (such as splitting information) for a region tree level of QTBT structure 130 (i.e., the solid lines) and syntax elements (such as splitting information) for a prediction tree level of QTBT structure 130 (i.e., the dashed lines). Video encoder 200 may encode, and video decoder 300 may decode, video data, such as prediction and transform data, for CUs represented by terminal leaf nodes of QTBT structure 130.

In general, CTU 132 of FIG. 2B may be associated with parameters defining sizes of blocks corresponding to nodes of QTBT structure 130 at the first and second levels. These parameters may include a CTU size (representing a size of CTU 132 in samples), a minimum quadtree size (Min QTSize, representing a minimum allowed quadtree leaf node size), a maximum binary tree size (Max BTSize, representing a maximum allowed binary tree root node size), a maximum binary tree depth (Max BTDepth, representing a maximum allowed binary tree depth), and a minimum binary tree size (Min BTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (Max BTSize), then the nodes can be further partitioned by respective binary trees. The binary tree splitting of one node can be iterated until the nodes resulting from the split reach the minimum allowed binary tree leaf node size (Min BTSize) or the maximum allowed binary tree depth (Max BTDepth). The example of QTBT structure 130 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the Min QTSize is set as 16×16, the Max BTSize is set as 64×64, the Min BTSize (for both width and height) is set as 4, and the Max BTDepth is set as 4. The quadtree partitioning is applied to the CTU first to generate quad-tree leaf nodes. The quadtree leaf nodes may have a size from 16×16 (i.e., the Min QTSize) to 128×128 (i.e., the CTU size). If the leaf quadtree node is 128×128, then the node is not further split by the binary tree, since the size exceeds the Max BTSize (i.e., 64×64, in this example). Otherwise, the leaf quadtree node will be further partitioned by the binary tree. Therefore, the quadtree leaf node is also the root node for the binary tree and has the binary tree depth of 0. When the binary tree depth reaches Max BTDepth (4, in this example), no further splitting is permitted. The binary tree node having a width equal to Min BTSize (4, in this example) implies that no further horizontal splitting is permitted. Similarly, a binary tree node having a height equal to Min BTSize implies no further vertical splitting is permitted for that binary tree node. As noted above, leaf nodes of the binary tree are referred to as CUs, and are further processed according to prediction and transform without further partitioning.

Figure 3:
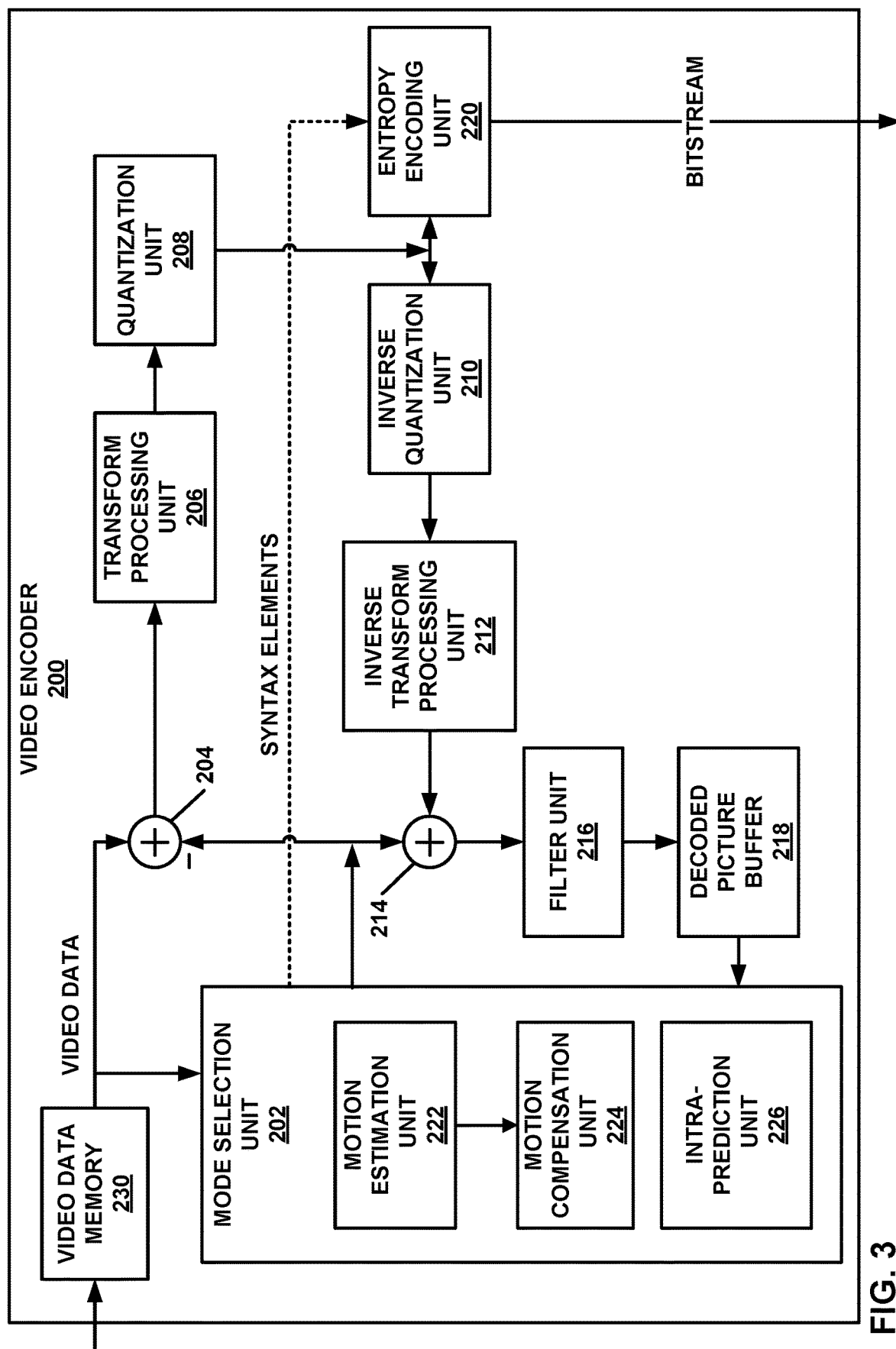
FIG. 3 is a block diagram illustrating an example video encoder that may perform the techniques of this disclosure.

FIG. 3 is a block diagram illustrating an example video encoder 200 that may perform the techniques of this disclosure. FIG. 3 is provided for purposes of explanation and should not be considered limiting of the techniques as broadly exemplified and described in this disclosure. For purposes of explanation, this disclosure describes video encoder 200 in the context of video coding standards such as the HEVC video coding standard, JEM, and/or the H.266/VVC video coding standard in development. However, the techniques of this disclosure are not limited to these video coding standards, and are applicable generally to video encoding and decoding. As will be explained in more detail below, video encoder 200 may be configured to derive QP values and/or DRA parameters using the techniques of this disclosure.

In the example of FIG. 3, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 3 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the object code of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, uncoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the coefficient blocks associated with the current block by adjusting the QP value associated with the CU. Quantization may introduce loss of information, and thus, quantized transform coefficients may have lower precision than the original transform coefficients produced by transform processing unit 206.

As will be explained in more detail below, quantization unit 208 may be configured to determine a picture quantization parameter (QP) value of the picture of video data, determine an intermediate chroma QP offset value for a chroma QP value based on the picture QP value and a first function based on video characteristics of the picture of video data, determine the chroma QP value as a function of the intermediate chroma QP offset value, and code (e.g., encode) the picture of video data using the chroma QP value.

Inverse quantization unit 210 and inverse transform processing unit 212 may apply inverse quantization and inverse transforms to a quantized transform coefficient block, respectively, to reconstruct a residual block from the transform coefficient block. In accordance with the techniques of this disclosure, inverse quantization unit 210 may be configured to use the determined chroma QP value determined by quantization unit 208 to perform inverse quantization.

Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 may store reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding blocks and the chroma coding blocks.

Figure 4:
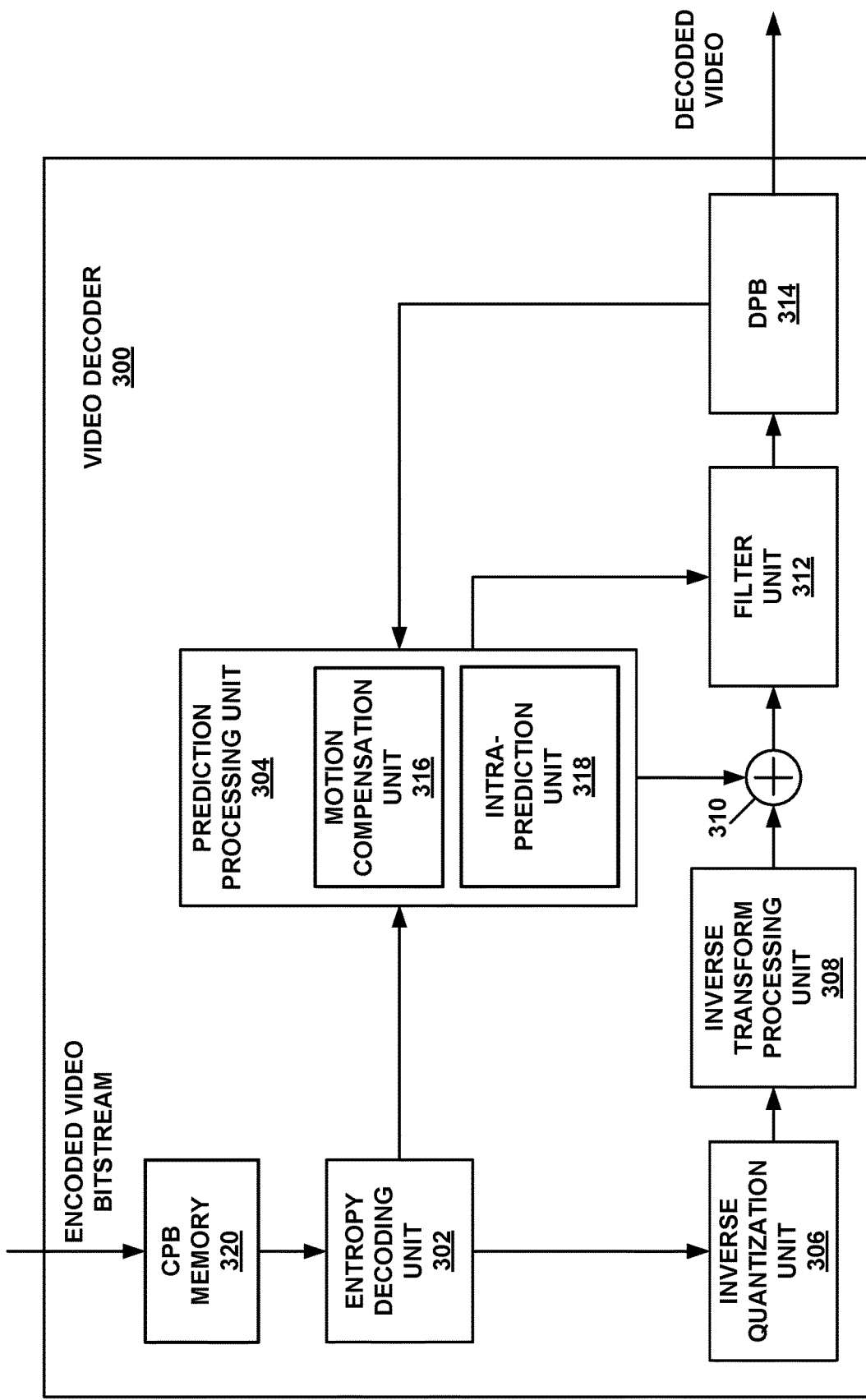
FIG. 4 is a block diagram illustrating an example video decoder that may perform the techniques of this disclosure.

FIG. 4 is a block diagram illustrating an example video decoder 300 that may perform the techniques of this disclosure. FIG. 4 is provided for purposes of explanation and is not limiting on the techniques as broadly exemplified and described in this disclosure. For purposes of explanation, this disclosure describes video decoder 300 is described according to the techniques of JEM, VVC, and HEVC. However, the techniques of this disclosure may be performed by video coding devices that are configured to other video coding standards. As will be explained in more detail below, video decoder 300 may be configured to derive QP values and/or DRA parameters using the techniques of this disclosure.

In the example of FIG. 4, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Prediction processing unit 304 includes motion compensation unit 316 and intra-prediction unit 318. Prediction processing unit 304 may include addition units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to executed by processing circuitry of video decoder 300.

The various units shown in FIG. 4 are illustrated to assist with understanding the operations performed by video decoder 300. The units may be implemented as fixed-function circuits, programmable circuits, or a combination thereof. Similar to FIG. 3, fixed-function circuits refer to circuits that provide particular functionality, and are preset on the operations that can be performed. Programmable circuits refer to circuits that can programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

As will be explained in more detail below, inverse quantization unit 306 may be configured to determine a picture quantization parameter (QP) value of the picture of video data, determine an intermediate chroma QP offset value for a chroma QP value based on the picture QP value and a first function based on video characteristics of the picture of video data, determine the chroma QP value as a function of the intermediate chroma QP offset value, and code (e.g., decode) the picture of video data using the chroma QP value.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 3).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 3). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures from DPB for subsequent presentation on a display device, such as display device 118 of FIG. 1.

Next generation video applications are anticipated to operate with video data representing captured scenery with HDR and/or WCG. Parameters of the utilized dynamic range and color gamut are two independent attributes of video content, and their specification for purposes of digital television and multimedia services are defined by several international standards. For example, ITU-R Rec. BT.709, "Parameter values for the HDTV standards for production and international programme exchange," and ITU-R Rec. BT.2020, "Parameter values for ultra-high definition television systems for production and international programme exchange," define parameters for HDTV (high definition television) and UHDTV (ultra-high definition television), respectively, such as standard dynamic range (SDR) and color primaries that extend beyond the standard color gamut. Rec. BT.2100, "Image parameter values for high dynamic range television for use in production and international programme exchange" defines transfer functions and representations for HDR television use, including primaries that support wide color gamut representations.

There are also other standards developing organization (SDOs) documents that specify dynamic range and color gamut attributes in other systems, e.g., DCI-P3 color gamut is defined in SMPTE-231-2 (Society of Motion Picture and Television Engineers) and some parameters of HDR are defined in SMPTE-2084. A brief description of dynamic range and color gamut for video data is provided below.

Dynamic range is typically defined as the ratio between the maximum and minimum brightness (e.g., luminance) of the video signal. Dynamic range may also be measured in terms of 'f-stop,' where one f-stop corresponds to a doubling of a signal's dynamic range. As defined by the Motion Picture Expert Group (MPEG), content that features brightness variation with more than 16 f-stops is referred as HDR content. In some terms, levels between 10 and 16 f-stops are considered as intermediate dynamic range but may be considered to be HDR according to other definitions. In some examples of this disclosure, HDR video content may be any video content that has a higher dynamic range than traditionally used video content with a standard dynamic range (e.g., video content as specified by ITU-R Rec. BT.709).

Figure 5:
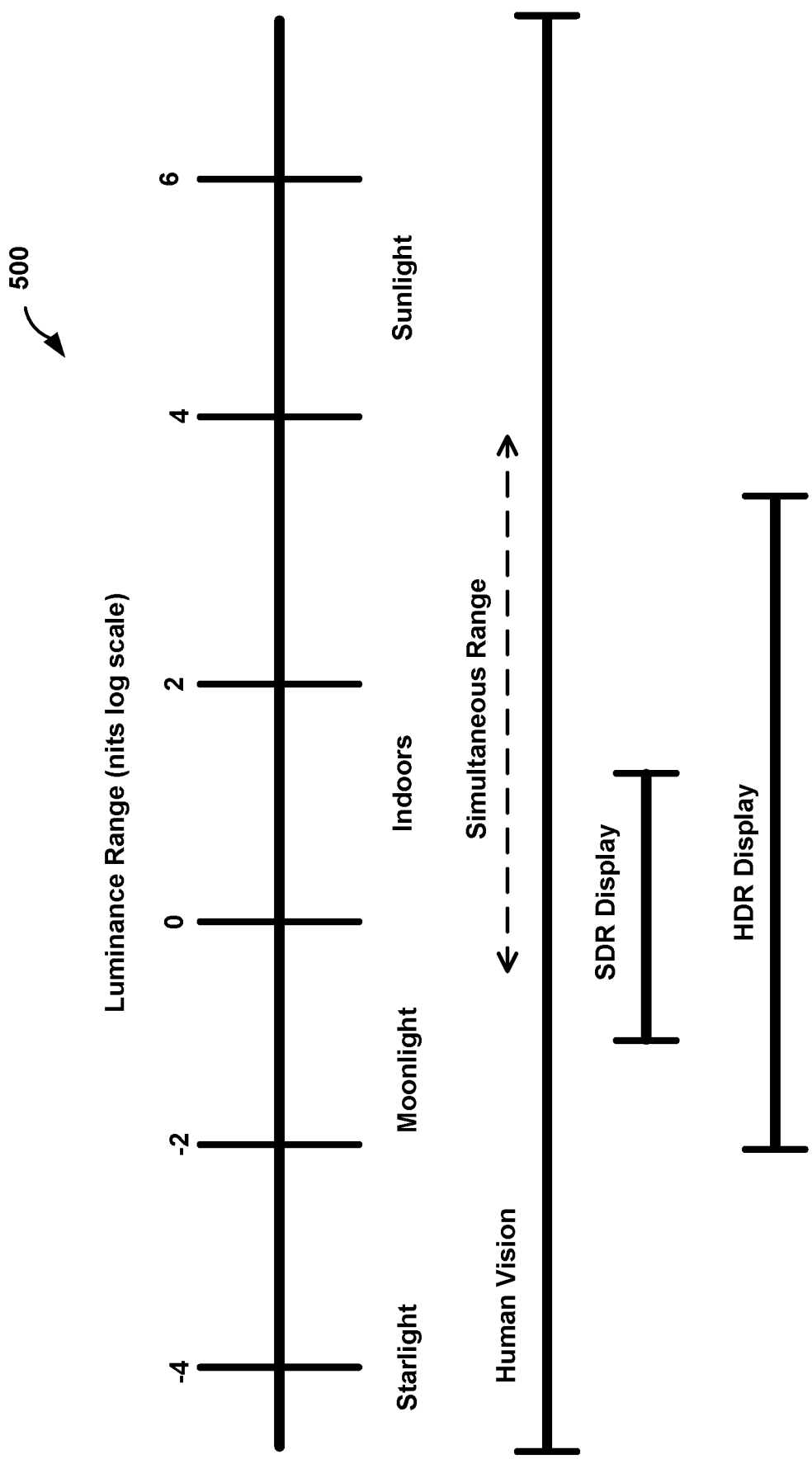
FIG. 5 is a conceptual drawing illustrating the concepts of high dynamic range (HDR) data.

The human visual system (HVS) is capable for perceiving much larger dynamic ranges than SDR content and HDR content. However, the HVS includes an adaptation mechanism to narrow the dynamic range of the HVS to a so-called simultaneous range. The width of the simultaneous range may be dependent on current lighting conditions (e.g., current brightness). A visualization 500 of the dynamic range provided by SDR of HDTV, expected HDR of UHDTV, and the HVS dynamic range is shown in FIG. 5, although the exact range may vary based on each individual and display.

Current video applications and services are regulated by ITU Rec. 709 and provide for SDR, typically supporting a range of brightness (e.g., luminance) of around 0.1 to 100 candelas (cd) per m2 (often referred to as "nits"), leading to less than 10 f-stops. Some example next generation video services are expected to provide dynamic range of up to 16 f-stops. Although detailed specifications for such content are currently under development, some initial parameters have been specified in SMPTE-2084 and ITU-R Rec. 2020.

Figure 6:
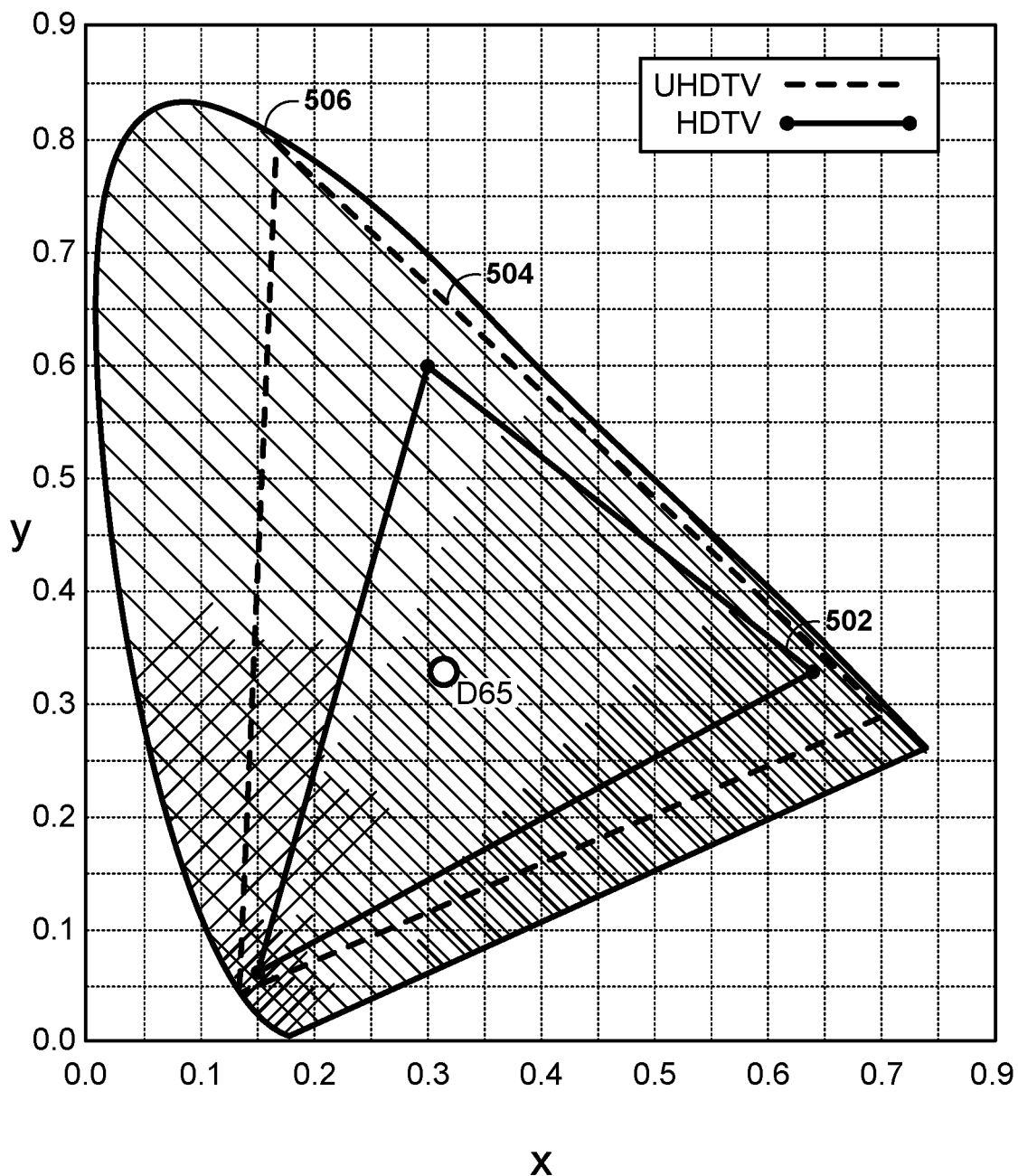
FIG. 6 is a conceptual diagram illustrating example color gamuts.

Another aspect for a more realistic video experience, besides HDR, is the color dimension. Color dimension is typically defined by the color gamut. FIG. 6 is a conceptual diagram showing an SDR color gamut (triangle 502 based on the BT.709 color primaries), and the wider color gamut that for UHDTV (triangle 504 based on the BT.2020 color primaries). FIG. 6 also depicts the so-called spectrum locus (delimited by the tongue-shaped area 506), representing the limits of the natural colors. As illustrated by FIG. 6, moving from BT.709 (triangle 502) to BT.2020 (triangle 504) color primaries aims to provide UHDTV services with about 70% more colors. D65 specifies an example white color for the BT.709 and/or BT.2020 specifications.

Examples of color gamut specifications for the DCI-P3, BT.709, and BT.2020 color spaces are shown in Table 1.

TABLE 1

| Color space | Color gamut parameters RGB color space parameters | | | | | | | |
|---|---|---|---|---|---|---|---|---|
| | White point | | Primary colors | | | | | |
| | $xx_W$ | $yy_W$ | $xx_R$ | $yy_R$ | $xx_G$ | $yy_G$ | $xx_B$ | $yy_B$ |
| DCI-P3 | 0.314 | 0.351 | 0.680 | 0.320 | 0.265 | 0.690 | 0.150 | 0.060 |
| ITU-R BT.709 | 0.3127 | 0.3290 | 0.64 | 0.33 | 0.30 | 0.60 | 0.15 | 0.06 |
| ITU-R BT.2020 | 0.3127 | 0.3290 | 0.708 | 0.292 | 0.170 | 0.797 | 0.131 | 0.046 |

As can be seen in Table 1, a color gamut may be defined by the X and Y values of a white point, and by the x and y values of the primary colors (e.g., red (R), green (G), and blue (B)). The x and y values represent normalized values that are derived from the chromaticity (X and Z) and the brightness (Y) of the colors, as is defined by the CIE 1931 color space. The CIE 1931 color space defines the links between pure colors (e.g., in terms of wavelengths) and how the human eye perceives such colors.

HDR/WCG video data is typically acquired and stored at a very high precision per component (even floating point), with the 4:4:4 chroma format and a very wide color space (e.g., CIE XYZ). This representation targets high precision applications and is almost mathematically lossless. However, such a format for storing HDR/WCG video data may include many redundancies and may not be optimal for compression purposes. A lower precision format with HVS-based assumptions may be utilized for state-of-the-art video applications.

Figure 7:
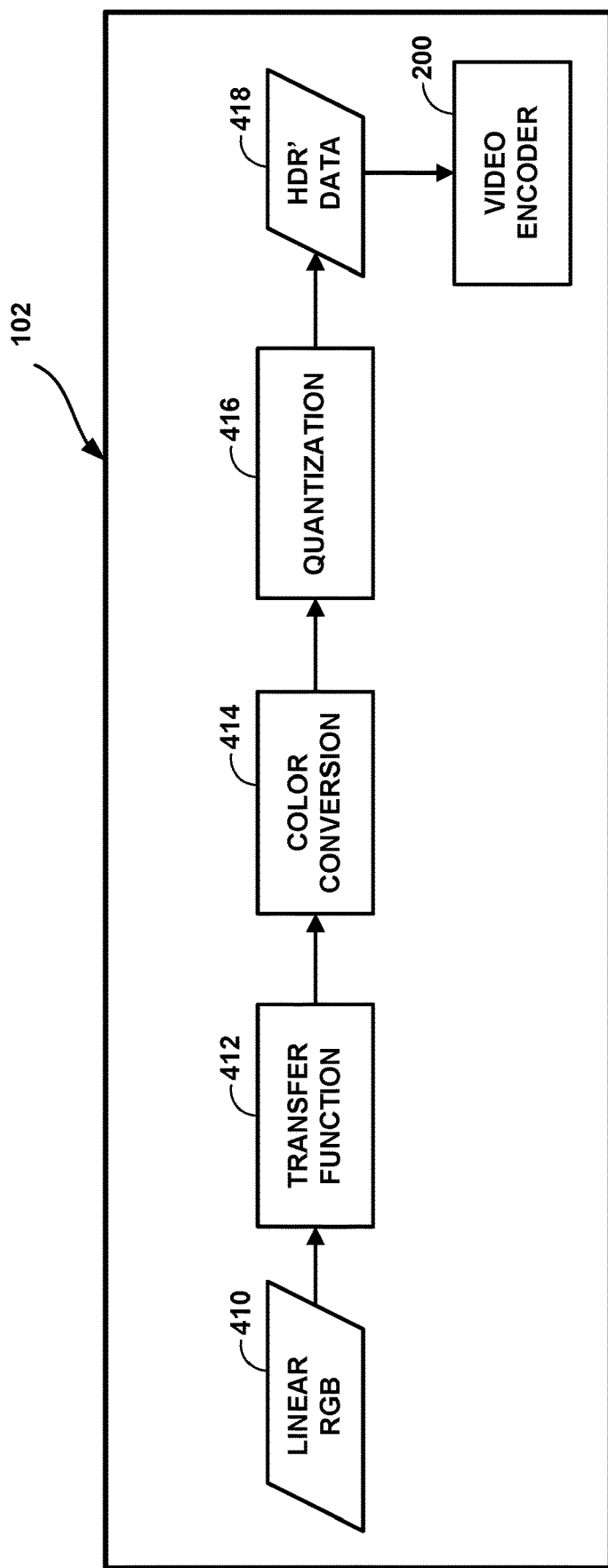
FIG. 7 is a flow diagram illustrating an example of HDR/wide color gamut (WCG) representation conversion.

One example of a video data format conversion process for purposes of compression includes three major processes, as shown in FIG. 7. The techniques of FIG. 7 may be performed by source device 102 (see FIG. 1). Linear RGB data 410 may be HDR/WCG video data and may be stored in a floating-point representation. Linear RGB data 410 may be compacted using a non-linear transfer function (TF) 412 for dynamic range compacting. Transfer function 412 may compact linear RGB data 410 using any number of non-linear transfer functions, e.g., the Perceptual Quantizer (PQ) TF as defined in SMPTE-2084. In some examples, color conversion process 414 converts the compacted data into a more compact or robust color space (e.g., a YUV or YCrCb color space) that is more suitable for compression by a hybrid video encoder. This data is then quantized using a floating-to-integer representation quantization unit 416 to produce converted HDR' data 418. HDR' data 418 represents the input data to video encoder 200. HDR' data 418 is the result of converting the original video data (e.g., Linear RGB data 410) into a video data format more suitable for compression. In this example HDR' data 418 is in an integer representation. The HDR' data 418 is now in a format more suitable for compression by a hybrid video encoder (e.g., video encoder 200 applying HEVC, VVC, or other hybrid video coding techniques). The order of the processes depicted in FIG. 7 is given as an example and may vary in other applications. For example, color conversion may precede the TF process. In addition, additional processing, e.g. spatial subsampling, may be applied to color components.

Figure 8:
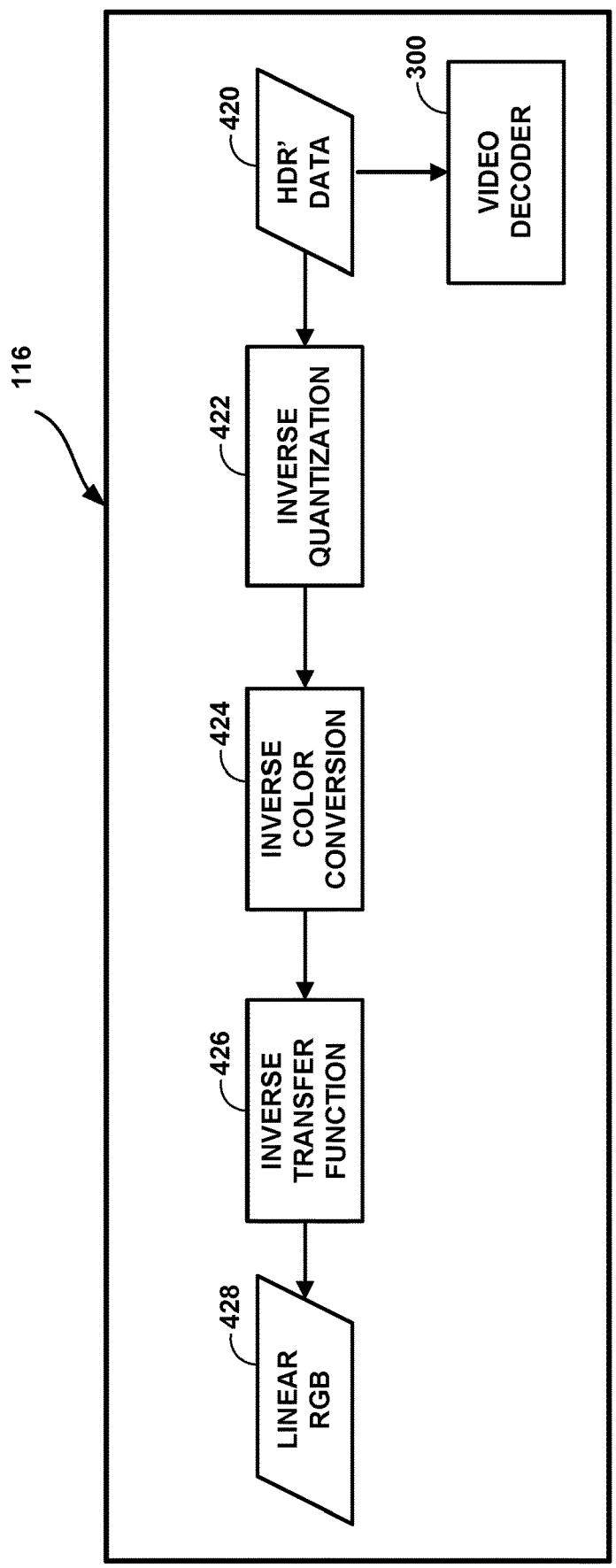
FIG. 8 is a flow diagram illustrating an example of HDR/WCG inverse conversion.

The inverse conversion at the decoder side is depicted in FIG. 8. The techniques of FIG. 8 may be performed by destination device 116 (see FIG. 1). Destination device 116 may obtain converted HDR' data 420 through decoding video data using a hybrid video decoder (e.g., by video decoder 300 applying HEVC, VVC, or other hybrid video coding techniques). HDR' data 420 may then be inverse quantized by inverse quantization unit 422. Then an inverse color conversion process 424 may be applied to the inverse quantized HDR' data. The inverse color conversion process 424 may be the inverse of color conversion process 414. For example, the inverse color conversion process 424 may convert the HDR' data from a YCrCb format back to an RGB format. Next, inverse transfer function 426 may be applied to the data to add back the dynamic range that was compacted by transfer function 412 to recreate the linear RGB data 428.

Figure 9:
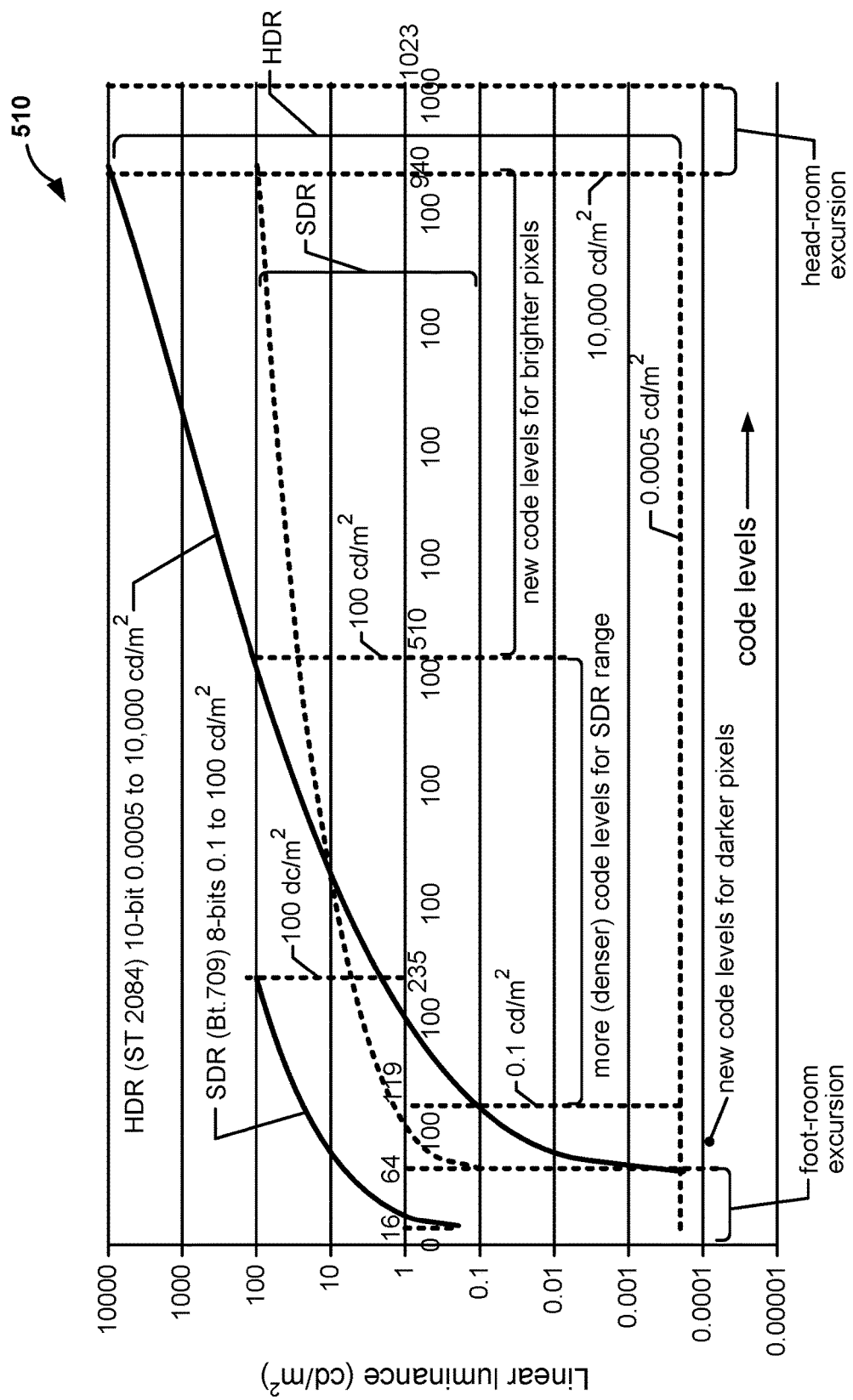
FIG. 9 is conceptual diagram illustrating example of Electro-optical transfer functions (EOTF) utilized for video data conversion (including standard dynamic range (SDR) and HDR) from perceptually uniform code levels to linear luminance.

The techniques depicted in FIG. 7 will now be discussed in more detail. In general, destination device 116 may apply a transfer function to data (e.g., HDR/WCG video data) to compact the dynamic range of the data such that errors due to quantization are perceptually uniform (approximately) across the range of luminance values. Such compaction allows the data to be represented with fewer bits. In one example, the transfer function may be a one-dimensional (1D) non-linear function and may reflect the inverse of an electro-optical transfer function (EOTF) of the end-user display, e.g., as specified for SDR in Rec. 709. In another example, the transfer function may approximate the HVS perception to brightness changes. An example of such a transfer function is the PQ transfer function specified in SMPTE-2084 (ST2084) for HDR. The inverse process of the OETF is the EOTF (electro-optical transfer function), which maps the code levels back to luminance. FIG. 9 shows several examples of non-linear transfer functions 510 used as EOTFs. The transfer functions may also be applied to each R, G and B component separately.

The specification of ST2084 defined the EOTF application as following. The TF is applied to a normalized linear R, G, B values which results in nonlinear representation of R'G'B'. ST2084 defines normalization by NORM=10000, which is associated with a peak brightness of 10000 nits (cd/m2).

$$R' = PQ\_TF(\max(0, \min(R/NORM, 1))) \quad (1)$$
$$G' = PQ\_TF(\max(0, \min(G/NORM, 1)))$$
$$B' = PQ\_TF(\max(0, \min(B/NORM, 1)))$$
$$\text{with } PQ\_TF(L) = \left(\frac{c_1 + c_2 L^{m_1}}{1 + c_3 L^{m_1}}\right)^{m_2}$$
$$m_1 = \frac{2610}{4096} \times \frac{1}{4} = 0.1593017578125$$
$$m_2 = \frac{2523}{4096} \times 128 = 78.84375$$
$$c_1 = c_3 - c_2 + 1 = \frac{3424}{4096} = 0.8359375$$
$$c_2 = \frac{2413}{4096} \times 32 = 18.8515625$$
$$c_3 = \frac{2392}{4096} \times 32 = 18.6875$$

Figure 10:
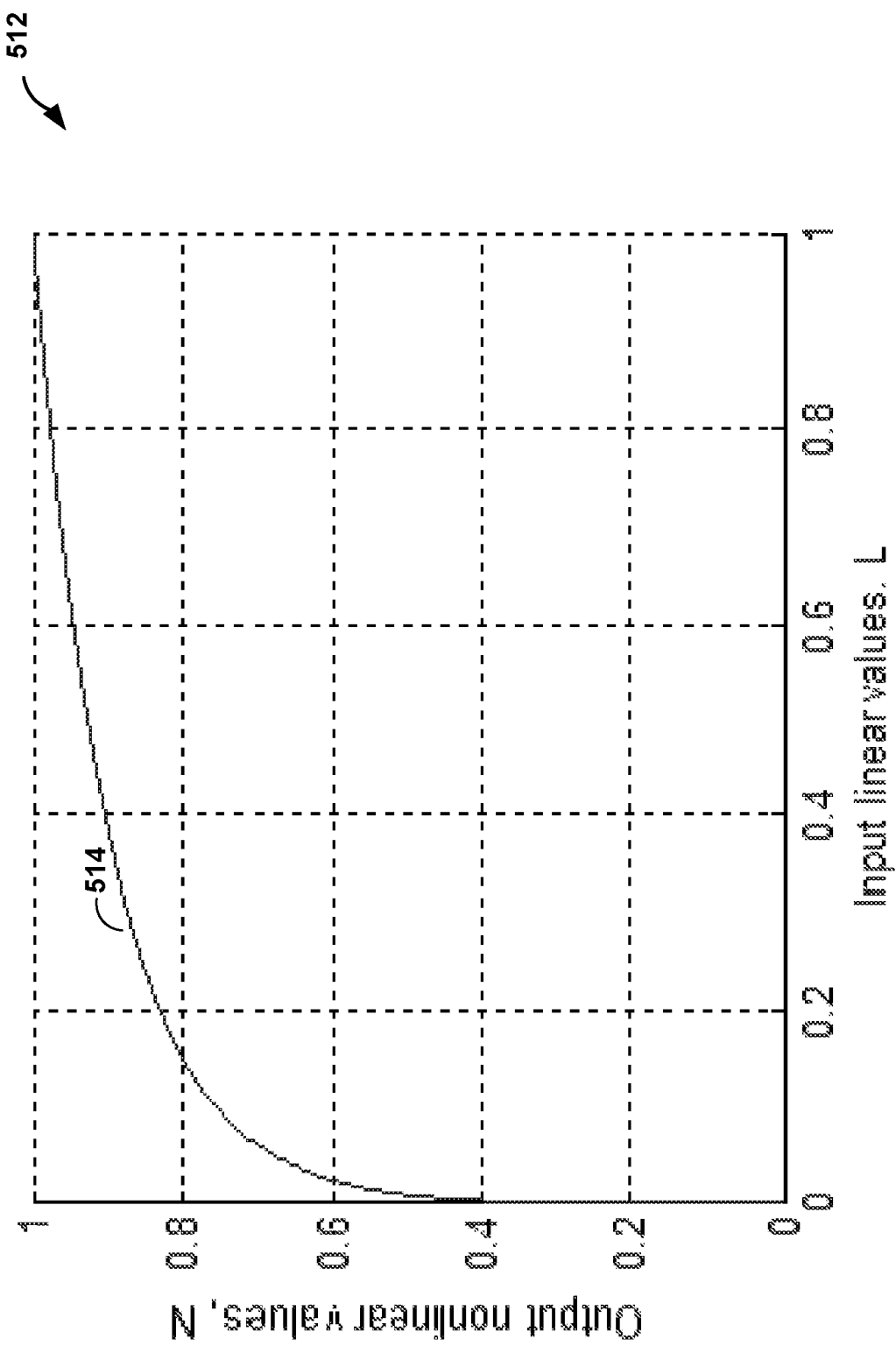
FIG. 10 is a graph illustrating a PQ transfer function.

With input values (e.g., linear color value) normalized to range 0 . . . 1 and normalized output values (e.g., non-linear color value), PQ EOTF 512 is visualized in FIG. 10. As seen from curve 514, 1 percent (low illumination) of the dynamic range of the input signal is converted to 50% of dynamic range of the output signal.

Typically, an EOTF is defined as a function with a floating-point accuracy, thus no error is introduced to a signal with this non-linearity if the inverse TF (so called OETF) is applied. The inverse TF (OETF) specified in ST2084 is defined as inversePQ function:

$$R = 10000 * inversePQ\_TF(R') \quad (2)$$
$$G = 10000 * inversePQ\_TF(G')$$
$$B = 10000 * inversePQ\_TF(B')$$
$$\text{with } inversePQ\_TF(N) = \left(\frac{\max[(N^{1/m_2} - c_1), 0]}{c_2 - c_3 N^{1/m_2}}\right)^{1/m_1}$$
$$m_1 = \frac{2610}{4096} \times \frac{1}{4} = 0.1593017578125$$
$$m_2 = \frac{2523}{4096} \times 128 = 78.84375$$
$$c_1 = c_3 - c_2 + 1 = \frac{3424}{4096} = 0.8359375$$
$$c_2 = \frac{2413}{4096} \times 32 = 18.8515625$$
$$c_3 = \frac{2392}{4096} \times 32 = 18.6875$$

With floating-point accuracy, sequential applications of EOTF and OETF provides a perfect reconstruction without errors. However, this representation is not optimal for streaming or broadcasting services. More compact representation with fixed bit accuracy of nonlinear R'G'B' data is described in following sections. Note, that EOTF and OETF is a subject of very active research currently, and the TF utilized in some HDR video coding systems may be different from ST2084. The techniques of this disclosure may be applicable for use with a TF or an inverse TF.

In the context of this disclosure, the terms "signal value" or "color value" may be used to describe a luminance level corresponding to the value of a specific color component (such as R, G, B, or Y) for an image element. The signal value is typically representative of a linear light level (luminance value). The terms "code level" or "digital code value" may refer to a digital representation of an image signal value. Typically, such a digital representation is representative of a nonlinear signal value. An EOTF represents the relationship between the nonlinear signal values provided to a display device (e.g., display device 32 of FIG. 1) and the linear color values produced by the display device.

RGB data is typically utilized as the input color space, since RGB is the type of data that is typically produced by image-capturing sensors. However, the RGB color space has high redundancy among its components and is not optimal for compact representation. To achieve more compact and a more robust representation, RGB components are typically converted (e.g., a color transform is performed) to a more uncorrelated color space that is more suitable for compression, e.g., YCbCr. A YCbCr color space separates the brightness in the form of luminance (Y luma channel) and chroma color information (Cr and Cb chroma channels) in different, less correlated components. In this context, a robust representation may refer to a color space featuring higher levels of error resilience when compressed at a constrained bitrate.

For modern video coding systems, YCbCr is a typically used color space, as specified in ITU-R BT.709 or ITU-R BT.709. The YCbCr color space in the BT.709 standard specifies the following conversion process from R'G'B' to Y'CbCr (non-constant luminance representation):

$$Y' = 0.2126 * R' + 0.7152 * G' + 0.0722 * B' \quad (3)$$
$$Cb = \frac{B' - Y'}{1.8556}$$
$$Cr = \frac{R' - Y'}{1.5748}$$

The above can also be implemented using the following approximate conversion that avoids the division for the Cb and Cr components:

$$Y'=0.212600*R'+0.715200*G'+0.072200*B'$$
$$Cb=-0.114572*R'-0.385428*G'+0.500000*B'$$
$$Cr=0.500000*R'-0.454153*G'-0.045847*B' \quad (4)$$

The ITU-R BT.2020 standard specifies the following conversion process from R'G'B' to Y'CbCr (non-constant luminance representation):

$$Y' = 0.2627*R' + 0.6780*G' + 0.0593*B' \quad (5)$$
$$Cb = \frac{B' - Y'}{1.8814}$$
$$Cr = \frac{R' - Y'}{1.4746}$$

The above can also be implemented using the following approximate conversion that avoids the division for the Cb and Cr components:

$$Y' = 0.262700*R' + 0.678000*G' + 0.059300*B'$$

$$Cb = -0.139630*R' - 0.360370*G' + 0.500000*B'$$

$$Cr = 0.500000*R' - 0.459786*G' - 0.040214*B' \quad (6)$$

It should be noted that both color spaces remain normalized, therefore, for the input values normalized in the range 0 . . . 1, the resulting values may be mapped to the range 0 . . . 1. Generally, color transforms implemented with floating-point accuracy provide perfect reconstruction, thus this process is lossless.

The processing stages described above are typically implemented in floating-point accuracy representation, and thus may be considered as lossless. However, this type of accuracy can be considered as redundant and expensive for most consumer electronics applications. For such services, input data in a target color space is converted to a target bit-depth fixed-point accuracy. Certain studies show that 10-12 bits accuracy in combination with the PQ TF is sufficient to provide HDR data of 16 f-stops with distortion below the Just-Noticeable Difference. In this example, the Just-Noticeable Difference is the amount of distortion that must be changed to be visually noticeable for a certain percentage of viewers (e.g., 50 percent). Data represented with 10 bits accuracy can be further coded with most of the state-of-the-art video coding solutions. This conversion process includes signal quantization and is an element of lossy coding and is a source of inaccuracy introduced to converted data.

An example of such quantization applied to code words in a target color space (the YCbCr color space in this example) is shown below. Input values YCbCr represented in floating point accuracy are converted into a signal of fixed bit-depth (BitDepthY for the Y value and BitDepthC for the chroma values (Cb, Cr)).

$$D_Y = Clip1_Y(Round((1<<(BitDepth_Y-8))*(219*Y'+16)))$$

$$D_{Cb} = Clip1_C(Round((1<<(BitDepth_C-8))*(224*Cb+128)))$$

$$D_{Cr} = Clip1_C(Round((1<<(BitDepth_C-8))*(224*Cr+128))) \quad (7)$$

with
Round(x)=Sign(x)*Floor(Abs(x)+0.5)
Sign(x)=−1 if x<0, 0 if x=0, 1 if x>0
Floor(x) the largest integer less than or equal to x
Abs(x)=x if x>=0, −x if x<0
Clip1$_Y$(x)=Clip3(0, (1<<BitDepth$_Y$)−1, x)
Clip1$_C$(x)=Clip3(0, (1<<BitDepth$_C$)−1, x)
Clip3(x,y,z)=x if z<x, y if z>y, z otherwise A DRA process was proposed in "Dynamic Range Adjustment SEI to enable High Dynamic Range video coding with Backward-Compatible Capability," D. Rusanovskyy, A. K. Ramasubramonian, D. Bugdayci, S. Lee, J. Sole, M. Karczewicz, VCEG document COM16-C 1027-E, September 2015. The authors proposed to implement DRA as a piece-wise linear function f(x) that is defined for a group of non-overlapped dynamic range partitions (ranges) {Ri} of input value x, where i is an index of the range with range of 0 to N−1, inclusive, and where N is the total number of ranges {Ri} utilized for defining DRA function. Assume that ranges of the DRA are defined by minimum and a maximum x value that belong to the range Ri, e.g., [$x_i$, $x_{i+1}$−1] where $x_i$ and $x_{i+1}$ denote minimum value of the ranges $R_i$ and $R_{i+1}$, respectively. Applied to the Y (luma) color component of the video data, DRA function Sy is defined through a scale $S_{y,i}$ and offset $O_{y,i}$ which are applied to every x∈[$x_i$, $x_{i+1}$−1], thus $S_y = \{S_{y,i}, O_{y,i}\}$.

With this, for any Ri, and every x∈[$x_i$, $x_{i+1}$−1], the output value X is calculated as follows:

$$X = S_{y,i} * (x - O_{y,i}) \quad (8)$$

For the inverse DRA mapping process for luma component Y conducted at video decoder 300, DRA function Sy is defined by inverse of scale $S_{y,i}$ and offset $O_{y,i}$ values which are applied to every X∈[$X_i$, $X_{i+1}$−1]. With this, for any Ri, and every X∈[$X_i$, $X_{i+1}$−1], the reconstructed value x is calculated as follows:

$$x = X/S_{y,i} + O_{y,i} \quad (9)$$

The forward DRA mapping process for chroma components Cb and Cr may be defined as following. The following example is given with term "u" denoting sample of a Cb color component that belongs to range Ri, u∈[$u_i$, $u_{i+1}$−1], thus $S_u = \{S_{u,i}, O_{u,i}\}$:

$$U = S_{u,i} * (u - O_{u,i}) + Offset \quad (10)$$

where Offset is equal to $2^{(bitdepth-1)}$ denotes the bi-polar Cb, Cr signal offset.

The inverse DRA mapping process conducted by video decoder 300 for chroma components Cb and Cr may be defined as follows. Example is given with U term denoting sample of remapped Cb color component which belongs to the range Ri, U∈[$U_i$, $U_{i+1}$−1]:

$$u = (U - Offset)/S_{u,i} + O_{y,i} \quad (11)$$

where Offset is equal to $2^{(bitdepth-1)}$ denotes the bi-polar Cb, Cr signal offset.

Luma-driven chroma scaling (LCS) was proposed in JCTVC-W0101, "HDR CE2: Report on CE2.a-1 LCS," A. K. Ramasubramonian, J. Sole, D. Rusanovskyy, D. Bugdayci, M. Karczewicz. JCTVC-W0101 described techniques for adjusting chroma information, e.g., Cb and Cr, by exploiting brightness information (e.g., luma) associated with the processed chroma sample. Similarly to the DRA approach of VCEG document COM16-C 1027-E, JCTVC-W0101 proposed to apply to a chroma sample a scale factor $S_u$ for Cb and $S_{v,i}$ for Cr. However, instead of defining a DRA function as a piece-wise linear function $S_u = \{S_{u,i}, O_{u,i}\}$ for a set of ranges {$R_i$} accessible by chroma value u or v, as in Equations (3) and (4), the LCS approach proposed to utilize a luma value Y to derive a scale factor for chroma samples. With this, forward LCS mapping of the chroma sample u (or v) is conducted as:

$$U = S_{u,i}(Y) * (u - Offset) + Offset \quad (12)$$

The inverse LCS process conducted at the decoder side is defined as following:

$$u = (U - \text{Offset})/S_{u,i}(Y) + \text{Offset} \quad (13)$$

In more detail, for a given pixel located at (x, y), chroma samples Cb(x, y) or Cr(x, y) are scaled with a factor derived from its LCS function $S_{Cb}$ (or $S_{Cr}$) accessed by its luma value Y'(x, y).

At the forward LCS for chroma samples, Cb (or Cr) values and their associated luma value Y' are taken as an input to the chroma scale function $S_{Cb}$ (or $S_{Cr}$) and Cb or Cr are converted into Cb' and Cr' as shown in Equation (14). At the decoder side, the inverse LCS is applied, and reconstructed Cb' or Cr' are converted to Cb, or Cr as is shown in Equation (15).

$$Cb'(x, y) = S_{Cb}(Y'(x, y)) * Cb(x, y), \quad (14)$$
$$Cr'(x, y) = S_{Cr}(Y'(x, y)) * Cr(x, y),$$

$$Cb(x, y) = \frac{Cb'(x, y)}{S_{Cb}(Y'(x, y))} \quad (15)$$

$$Cr(x, y) = \frac{Cr'(x, y)}{S_{Cr}(Y'(x, y))}$$

Figure 11:
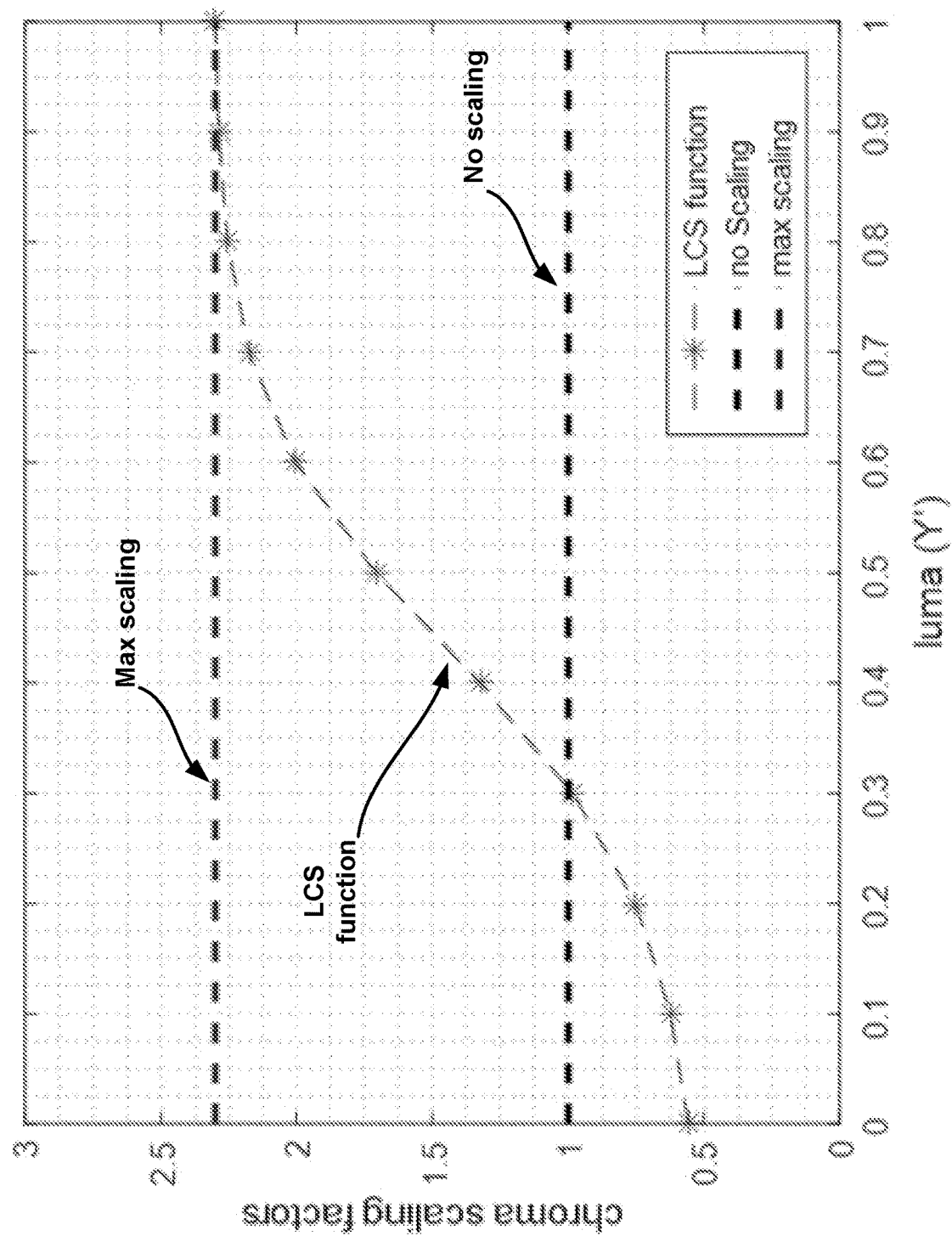
FIG. 11 is a graph illustrating a luma-driven chroma scaling (LCS) function.

FIG. 11 shows an example of LCS functions. With the LCS function in the example in FIG. 11, chroma components of pixels with smaller values of luma are multiplied with smaller scaling factors.

The relationship between DRA sample scaling and quantization parameters (QPs) of a video codec will now be discussed. To adjust compression ratio at video encoders (e.g., video encoder 200), block transform-based video coding schemes, such as HEVC, utilize a scalar quantizer, which is applied to a block of transform coefficients. For example:

$$Xq = X/\text{scalerQP}$$

where Xq is a quantized codevalue of the transform coefficient X produced by applying scaler scalerQP derived from the QP. In most codecs, the quantized codevalue would be approximated to an integer value (e.g., by rounding). In some codecs, the quantization may be a different function which depends not just on the QP but also on other parameters of the codec.

The scaler value scalerQP is controlled with the QP. The relationship between the QP and the scalar quantizer is defined as following, where k is a known constant:

$$\text{scalerQP} = k * 2^{(QP/6)} \quad (16)$$

The inverse function defines the relationship between the scalar quantizer applied to the transform coefficient and the QP of HEVC, as follows:

$$QP = \ln(\text{scalerQP}/k) * 6/\ln(2); \quad (17)$$

Respectively, additive change in the QP value, e.g. deltaQP, would result in a multiplicative change in the scalerQP value applied to the transform coefficients. A DRA process is effectively applying scaleDRA value to the pixel sample values, and taking into consideration transform properties, can be combined with scalerQP values as following:

$$Xq = T(\text{scaleDRA} * x)/\text{scaleQP}$$

where Xq are quantized transform coefficients produced by transform T of the scaled x sample values and scaled with scaleQP applied in the transform domain. Thus, applying the multiplicator scaleDRA in the pixel domain results in effective change of scaler quantizer scaleQP, which is applied in the transform domain. This in turn can be interpreted in the additive change of the QP value applied to the current processed block of data:

$$dQP = \log 2(\text{scaleDRA}) * 6; \quad (18)$$

where dQP is approximate QP offset introduced by HEVC by deploying DRA on the input data.

Chroma QP dependency on the luma QP value will now be discussed. Some of state-of-the-art video coding designs, such as HEVC and newer video coding standards, may utilize a pre-defined dependency between luma and chroma QP values that are effectively applied to process currently coded chroma block Cb and/or Cr. Such a dependency may be utilized to achieve an optimal bitrate allocation between luma and chroma components An example of such a dependency is represented by Table 8-10 of the HEVC specification, where QP values applied for decoding chroma samples are derived from QP values utilized for decoding luma samples. The relevant sections of HEVC where the chroma QP value is derived based on the QP value of the corresponding luma sample (e.g., the QP value applied to the block/TU of the corresponding luma sample), chroma QP offsets, and Table 8-10 of HEVC specification are reproduced below:

When ChromaArrayType is not equal to 0, the following applies:

The variables $qP_{Cb}$ and $qP_{Cr}$ are derived as follows:

If tu_residual_act_flag[xTbY][yTbY] is equal to 0, the following applies:

$$qPi_{Cb} = \text{Clip3}(-QpBdOffset_C, 57, Qp_Y + pps\_cb\_qp\_offset + \text{slice}\_cb\_qp\_offset + CuQpOffset_{Cb}) \quad (8\text{-}287)$$

$$qPi_{Cr} = \text{Clip3}(-QpBdOffset_C, 57, Qp_Y + pps\_cr\_qp\_offset + \text{slice}\_cr\_qp\_offset + CuQpOffset_{Cr}) \quad (8\text{-}288)$$

Otherwise (tu_residual_act_flag[xTbY][yTbY] is equal to 1), the following applies:

$$qPi_{Cb} = \text{Clip3}(-QpBdOffsetC, 57, QpY + PpsActQpOffsetCb + \text{slice}\_act\_cb\_qp\_offset + CuQpOffsetCb) \quad (8\text{-}289)$$

$$qPi_{Cr} = \text{Clip3}(-QpBdOffsetC, 57, QpY + PpsActQpOffsetCr + \text{slice}\_act\_cr\_qp\_offset + CuQpOffsetCr) \quad (8\text{-}290)$$

If ChromaArrayType is equal to 1, the variables $qP_{Cb}$ and $qP_{Cr}$ are set equal to the value of $Qp_C$ as specified in Table 8-10 based on the index qPi equal to $qPi_{Cb}$ and $qPi_{Cr}$, respectively.

Otherwise, the variables $qP_{Cb}$ and $qP_{Cr}$ are set equal to Min(qPi, 51), based on the index qPi equal to $qPi_{Cb}$ and $qPi_{Cr}$, respectively.

The chroma quantization parameters for the Cb and Cr components, $Qp'_{Cb}$ and $Qp'_{Cr}$, are derived as follows:

$$Qp'_{Cb} = qP_{Cb} + QpBdOffset_C \quad (8\text{-}291)$$

$$Qp'_{Cr} = qP_{Cr} + QpBdOffset_C \quad (8\text{-}292)$$

TABLE 8-10

Specification of $Qp_C$ as a function of qPi for ChromaArrayType equal to 1

| | qPi | | | | | | | | | | | | | | | |
|---|---|---|---|---|---|---|---|---|---|---|---|---|---|---|---|---|
| | <30 | 30 | 31 | 32 | 33 | 34 | 35 | 36 | 37 | 38 | 39 | 40 | 41 | 42 | 43 | >43 |
| $Qp_C$ | = qPi | 29 | 30 | 31 | 32 | 33 | 33 | 34 | 34 | 35 | 35 | 36 | 36 | 37 | 37 | = qPi − 6 |

The derivation of a chroma scaling factor for DRA will now be discussed. In video coding systems employing both the uniform scalar quantization in the transform domain and pixel domain scaling with DRA, the derivation of the scale DRA value applied to chroma samples (Sx) can be dependent on the following:

$S_Y$: Luma scale value of the associated luma sample $S_{CX}$: Scale derived from the gamut of the content, where CX stands for Cb or Cr as applicable $S_{corr}$: correction scale term based for accounting for mismatch in transform coding and DRA scaling, e.g. to compensate for the dependencies introduced by Table 8-10 of the HEVC $S_X$=fun($S_Y$, $S_{CX}$, $S_{corr}$). One example is a separable function defined as follows: $S_X$=f1($S_Y$)*f2($S_{CX}$)*f3($S_{corr}$).

QP cascading in hierarchical prediction structures will now be discussed. Video compression techniques often employ hierarchical prediction structures for a group of pictures. For example, see "Hierarchical B pictures," JVT-P014, Poznan, P L, July 2005. Pictures may be classified in hierarchical layers, such that a picture may only be predicted from other pictures that belong to the same hierarchical layer or below.

Although such configurations may be decided by the encoder, some particular configurations may also be mandated by certain specifications/standards. Some advantages of hierarchical prediction structures include temporal scalable layers (e.g., certain subset of the hierarchical pictures may be decodable to obtain the video at a lower frame rate than the entire sequence without missing reference pictures) and coding efficiency. Key pictures (these pictures are used directly or indirectly in the reference of several pictures) are considered lower in the hierarchy. Typically the higher the hierarchical layer a picture picB belongs, the less the numbers pictures that use picB as reference (directly or indirectly). Indirect reference is used to indicate an iterative reference (e.g., if picC directly references picB and picD directly reference picC, then picD indirectly references picB; if picF indirectly reference picE and picE indirectly reference picB then picF indirectly references picB).

The quantization parameter used to quantize the coefficients of pictures in each layer is also chosen based on maximizing the coding efficiency. Although JVT-P014 suggests some methods to choose the QP values, encoders may employ different techniques and the QP values used are signaled in the bitstream. Key pictures, which are at a lower hierarchical layer, are typically coded with a lower QP values (e.g., resulting in a higher visual quality) than pictures at a higher hierarchical layer. An example of how the pictures of a group of pictures (GOP) size of 16 are coded is given below with respect to the picture order count (POC) number and a reference QP of 30.

TABLE 2

Example of QP cascading; QP values of picture lower in the hierarchy are lower than QP of pictures higher in the hierarchy.

| | POC | | | | | | | | | | | | | | | | |
|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 |
| Hier. Layer | 0 | 5 | 4 | 5 | 3 | 5 | 4 | 5 | 2 | 5 | 4 | 5 | 3 | 5 | 4 | 5 | 1 |
| QP | 27 | 36 | 35 | 36 | 34 | 36 | 35 | 36 | 31 | 36 | 35 | 36 | 34 | 36 | 35 | 36 | 31 |

Compared to SDR content, it has been observed that chroma artifacts are more visible in HDR content when encoding with techniques that are similar to SDR coding. For example, more chroma artifacts may be visible in bright regions of the image. Signalling a chroma QP offset that is a function of the base QP parameter for luma components is one way of reducing the impact of these techniques.

Another method is to scale the chroma samples (e.g., using a DRA process) to reflect the chroma QP offset term, thereby potentially improving the overall coding of the chroma samples. However, QP cascading (coding different pictures of the video with different QP) affects the chroma QP offset that should be signalled for the pictures. Using a single chroma QP offset value for all the pictures in a sequence results in fewer matched chroma QP offsets being applied to different pictures in the sequences, thereby affecting the viewing experience. Signalling of chroma QP offset for a picture would result in additional bits to be signalled, thereby affecting the coding performance. If chroma DRA scaling is applied to each picture based on the QP associated with the picture, then the chroma DRA parameters are signalled for each picture, which also results in more bits.

This disclosure describes several techniques that may improve dynamic range adjustment across multiple pictures and the integration of dynamic range adjustment with hybrid, transform-based video codecs, including signaling. It is to be understood that one or more of these techniques may be used independently, or in combination with other techniques.

In a first example of the disclosure, video encoder 200 and/or video decoder 300 may use as input a first QP value (e.g., a luma or a picture QP value) and one or more sets of parameters (e.g., a first set of parameters and a second set of parameters) to determine an intermediate chroma QP offset value used for determining a chroma QP value. A luma QP value or picture QP value may be a QP value for an entire picture of video data and may be used to determine other QP values for the pictures (e.g., block-level QP values). Video encoder 200 and/or video decoder 300 may derive a first value/variable (e.g., an intermediate chroma QP offset value) using the first QP value and a first subset of the first set of parameters and/or all of the first set of parameters. As will be explained in more detail below, the first set of parameters may include characteristics of the video data. Video characteristics may include a color container used to store the video data (e.g., BT.709, BT.2020, etc.), a chroma sub-sampling format (e.g., 4:4:4, 4:2:2, 4:2:0), a color gamut of the video data, a color space (e.g., RGB, YCbCr, YUV, ICtCp, etc.), and/or a color component. Video encoder 200 and video decoder 300 may use the video characteristics to determine a lookup table from among multiple lookup tables that is used to determine the intermediate chroma QP offset value. In another example, the video characteristics may be used to determine a function from among a plurality of functions to determine the intermediate chroma QP offset values. In this way, the functions and/or lookup tables used to determine intermediate chroma QP offset values may be tailored to specific color components (e.g., luma components or chroma components), may be tailored to specific color gamuts (e.g., specific HDR or SDR color gamuts), may be tailored to specific color containers (e.g., BT.709, BT.2020, etc.), and/or may be tailored to specific color spaces (e.g., RGB, YUV, YCbCr, etc.). An example of a using a first set of parameters to determine a lookup table is described below and shown in FIG. 12.

Video encoder 200 and/or video decoder 300 may derive a second value/variable using the first value/variable and a second subset of the second set of parameters and/or all of the second set of parameters. In some examples, the second value/variable may be the chroma QP value or an input to another lookup table that is used determine the chroma QP value. In various examples discussed below, the first set of parameters and the second set of parameters may include QP values and QP offset values. In other examples, the first set of parameters and the second set of parameters may be DRA parameters. However, it should be understood that other types of parameters may be used in conjunction with the techniques of this disclosure. The first value/variable and the second value/variable may be considered intermediate values/variables that may be used to determine a particular output value (e.g., an output QP value and/or DRA parameters).

In one example of the disclosure, video encoder 200 and/or video decoder 300 may derive an output QP value from the first and second values/variables and apply the output QP value for coded/decoded samples at the block level in the transform domain. In other examples, video encoder 200 and/or video decoder 300 may be configured to convert the output QP value to an associated scale value and apply the associated scale value to coded/decoded samples at the sample level.

In another example, video encoder 200 and/or video decoder 300 may use different derivation functions for the derivation of the said first and the second values/variables. As will be explained in Example 1 below, a parametric equation may be used as a first derivation function to determine an intermediate chroma QP offset value (e.g., chQPOffset2(qp) in Example 1)) below. The intermediate chroma QP offset value may then be used to determine a chroma QP value as described below.

In another example, the derivation functions may be defined through a lookup table or tables. Example lookup tables are described below with reference to Example 1. In other examples the derivation function can be defined through a parametric function definition, e.g., a linear or non-linear function. In one example, the lookup tables may include the quantized outputs of one or more parametric functions.

In other examples, video encoder 200 and/or video decoder 300 may derive an output QP value (e.g., a chroma QP value) as a sum of the first and second values (outQP=value1+value2). In other examples, video encoder 200 and/or video decoder 300 may derive the output QP value through multiplication of the first and second values.

In some examples, the first derivation function (e.g., a parametric function or lookup table to derive an intermediate chroma QP offset value) and/or the second derivation function (e.g., a parametric function or lookup table to derive a chroma QP from the intermediate chroma QP offset value) may be signaled or identified (e.g. among a set of functions available) through syntax elements of the bitstream. Examples of the first derivation function and the second derivation function will be described below in Example 1. In some examples, identification of a derivation function may be performed at video decoder 300.

In other examples, DRA parameters (e.g., DRA scales and/or offsets used for a given sample(s) for which an output PQ value is being derived) may be used as the parameter set to derive the first or second value. Video encoder 200 may be configured to general and signal DRA parameters in one or more syntax structures in the encoded video bitstream.

In other examples, the first set of parameters may include one or more QP values of QP offset values. For example, a luma delta QP value signalled in the bitstream, and a chroma QP offset value. Examples 1 and 2 below includes descriptions of techniques of how QP values and/or QP offset values may be used to determine intermediate chroma QP offset values and/or DRA parameters.

In another example, the second set of parameters may include one or more QP values of QP offset values. For example, a luma delta QP value signalled in the bitstream, and a chroma QP offset value. Examples 1 and 2 below includes descriptions of techniques of how QP values and/or QP offset values may be used to determine chroma QP values and/or DRA parameters.

In other examples, one or more parameters in the first and second set of parameters may be signalled in the bitstream or derived at video decoder 300.

In another example, video encoder 200 and video decoder 300 may be configured to define baseQP as a reference QP parameter. define 1QP1 as a first luma QP offset parameter, define 1QP2 as a second luma QP offset parameter, and define cQP as a chroma QP offset parameter. In this example, the first set of parameters include baseQP, 1QP1, 1QP2, and cQP, and the second set of parameters include baseQP, 1QP2, cQP. Video encoder 200 and video decoder 300 may be configured to derive the first value/variable (e.g., the intermediate chroma QP offset value) from baseQP, 1QP1, 1QP2 and cQP, and derive the second variable (e.g., the chroma QP and/or a DRA scale value) from the first value/variable, baseQP, 1QP1, 1QP2 and cQP. In one example, the first value/variable x is derived as fun1(baseQp+1QP1−1QP2−cQP) and the second value/variable is derived as fun2(baseQP+1QP1+x+1QP2+cQP), where fun1( ) and fun2( ) represent the first and second derivation functions. The variable 1QP1 make represent a hierarchical QP value, while 1QP2 may represent QP values derives from block-level DRA scale values. In another example, the input QP value may be replaced by an input scale value, or the input QP value may be derived from an input scale value. The input scale value may be signalled in the bitstream or pre-determined by the video encoder 200 and/or video decoder 300.

In other examples of the disclosure, video encoder 200 may be configured to signal the one or more lookup tables (e.g., the lookup tables described in Examples 1-4 below) in the bitstream.

In another example, video encoder 200 may be configured to signal, and video decoder 300 may be configured to receive, one or more pairs of QP values indicating the QP values to use to code the video data, where each pair contains an output QP value and an input QP value. In this example, the input QP value may be the picture QP value, and the output QP value may be the chroma QP value.

In another example, video encoder 200 may be configured to signal, and video decoder 300 may be configured to receive, a list of output QP values and a list of corresponding input QP values. For example, the list of input QP values and output QP values may be in the form of a lookup table. In some examples, the list of output QP values may be pre-determined and hence not signalled. In such cases, the input QP values corresponding to the pre-determined list of output values is sent.

In another example, video encoder 200 may be configured to signal, and video decoder 300 may be configured to receive, a first QP value (input or output). Video encoder 200 may be configured to signal, and video decoder 300 may be configured to receive, a delta value indicating the difference between a second QP value (input or output) and the first QP value. In other examples, an input table may not be signalled as QP value pairs/sets/lists and a relation between the input and output QP values may be defined by a function defined by parameters. An example function is described below in Example 1. The values of the parameters may be signalled.

Video encoder 200 may be configured to signal, and video decoder 300 may be configured to receive, one or more indices in the bitstream to indicate/specify a lookup table (or set of tables) to be used by video decoder 300 for deriving the output chroma QP values.

Video encoder 200 may be configured to signal, and video decoder 300 may be configured to receive, one or more indices in the bitstream to indicate/specify a lookup table (or set of tables) to be used by video decoder 300 for deriving the chroma DRA scale values (or chroma inverse DRA scale values).

Video decoder 300 may be configured to derive the input lookup tables from pre-determined methods or using the signalled syntax elements. Video encoder 200 and video decoder 300 may use the input lookup table to determine an intermediate chroma QP offset value. Video encoder 200 and video decoder 300 may then use the intermediate chroma QP offset value, in conjunction with parameters, to determine the chroma QP value. The input table can be derived from one or more QP tables signalled to, predetermined by, or derived by video decoder 300. When no output QP value is signalled or specified for an input QP value, the input QP value and the corresponding output QP value may be derived by interpolating between two or more QP value pairs (i.e., an input QP value and its associated output QP value), by copying the values from a nearby QP value pair (e.g., the nearest input QP value in the lookup table), or by interpolating between a nearby QP value and a pre-defined QP value pair (e.g., QP pair of 0,0).

In some examples that use a lookup table, video encoder 200 and/or video decoder 300 may be configured to select/determine an input QP value and obtain an output QP value from the table by finding a corresponding entry for the input QP value in the table. Video encoder 200 and/or video decoder 300 may be configured to derive the chroma QP value (e.g., the output QP value) to quantize or de-quantize the chroma coefficients from an output value (e.g., an intermediate chroma QP offset value of Example 1). When an explicit table is not constructed at video decoder 300, a pre-determined function derived from the one or more parameters signalled in the bitstream may be used to derive the chroma QP value used to quantize/de-quantize the coefficients. Example parameters are described below in Example 1.

In some examples, when an input QP value and output QP value are not specified in the table, the input QP value and output QP values are derived by interpolating a different set of QP value pairs (e.g. adjacent to the input QP values). In other examples this interpolated QP value is rounded to an integer value using a pre-determined method (e.g., rounding, floor, or ceiling functions).

In some examples, the functions or tables describing the relationship between input and output QP values may be defined in floating point representation.

Some of the techniques described above may be applied at video encoder 200 or video decoder 300, or both. Although many of the techniques disclosed are for chroma components, the techniques of this disclosure may also be applicable for luma and for components in other color spaces that may be used to represent the video.

Below are four detailed example techniques that use or more of the techniques described above. The example techniques described below may be used to derive chroma QP values and DRA parameters for pictures of video data. The techniques described below may reduce and/or limit chroma artifacts that may result from coding HDR and/or WCG video data. As discussed above, when using hierarchical coding, QP values vary from frame to frame. When processing HDR/WCG video data using DRA adjustment, it may be beneficial to also vary DRA parameters (e.g., DRA scale and offset) from frame to frame. However, in order to reduce implementation complexity, some example techniques for DRA adjustment keep the DRA parameters fixed across an entire video sequence (e.g., multiple pictures). Since there is some interrelationship between DRA parameters and QP values, this disclosure proposes the following techniques for determining chroma QP values on a frame by frame basis that achieves approximately the same results as varying the chroma DRA scale values from frame to frame.

Example 1

Figure 12:
FIG. 12 is an example table for use with the techniques of this disclosure.

In one example of the disclosure, video encoder 200 and video decoder 300 may store and use a set of lookup tables to determine intermediate values (e.g., intermediate chroma QP offset values) used for determining chroma QP values. A set of lookup tables 550 may be defined, as shown in FIG. 12, with the first row indicating an input QP value (e.g., a picture QP or luma QP) and each subsequent row corresponding to a specific table that provides an output intermediate value (e.g., intermediate chroma QP offset values) given the input QP.

Each of the individual lookup tables in lookup tables 550 may be designed for particular video characteristics. For example, video encoder 200 and video decoder 300 may be configured to determine the specific lookup table of lookup tables 550 to be used for a picture based on the color gamut of the video data and the color component of the video data to which the table is to be applied. For example, lookup table Tab0 may be applied for luma samples, lookup table Tab1 may be applied for Cb samples for content that have a BT.709 color gamut, lookup table Tab2 may be applied for Cr samples for content that have a BT.709 color gamut, lookup table Tab3 may be applied for Cb samples for content that have a P3 color gamut, and lookup table Tab4 may be applied for Cr samples for content that have a P3 color gamut. Let ChTableQP( ) define the input and output QP relation as defined by one the tables shown in FIG. 12.

In some examples, video encoder 200 may be configured to signal a syntax element that indicates which of the tables of lookup tables 550 is to be used for one or more color components. This syntax element could be an index to the set of tables defined above. In some examples, the lookup tables themselves may be signalled in the bitstream.

A further table 560, as shown in FIG. 13, may be defined in order to derive the QP value to be used to code the chroma coefficients. That is, the output of the tables in FIG. 12 may be used as the input to lookup table 560 in FIG. 13. The output of lookup table 560 (TableQp(qp)) may be called an intermediate chroma QP offset value, which may be used to determine a chroma QP value, as described below.

Define an offset function chQPOffset2( ) as follows:

$$chQPOffset2(qp) = ChTableQP(qp) - qp$$

In this example, chQPOffset2 is the intermediate chroma QP offset value and qp is the picture qp. ChTableQp is a particular table from the plurality of lookup tables shown in FIG. 12. The particular table used is based on characteristics of the video data. This chroma offset term (e.g., chroma offset value) accounts for the gamut properties and is handled by the quantization lookup tables 550 (e.g., FIG. 12) stored at video encoder 200 and video decoder 300. As will be described below, the chroma DRA scale values only account for the terms due to the luma scale and the correction term (Scorr described below) arising thereof. When luma and chroma samples are coded without DRA, a QP relationship between coding of luma and chroma samples is assumed. Table 560 of FIG. 13 is an example of the specification of such a relationship. Although QP offset values may be signalled for chroma samples, the final QP value is determined by this relationship, which is entirely a function of luma QP/offset and chroma QP/offsets. When DRA scale values are applied to luma and chroma, the scale values are typically determined based on the characteristics of the video data (without compression). The presence of this QP relationship could alter the characteristics of the signal in a manner not desirable based on the DRA parameter derivation. The correction term is applied to the scale values of chroma to account for this QP coding relationship.

In other examples, rather than using one of a plurality of lookup tables ChTableQP, video encoder 200 and video decoder 300 may use a parametric function based on characteristics of the video data to determine the intermediate chroma QP offset value. For example, video encoder 200 and video decoder 300 may use function $f(x)$ $f(x)=a1*x+b1$. Video encoder 200 and video decoder 300 may further use scale parameters S_Cb and S_Cr for the scale terms for Cb and Cr, respectively. The term g(x) is the intermediate chroma QP offset value, where $g(x)=S\_C*f(x)$ and $g(x)=S\_C*f(x)$ where S_C is either S_Cb and S_Cr for Cb and Cr, respectively.

The term g(x) is an offset term. The table values (e.g., Tab1 to Tab 4 in FIG. 12) may be derived as follows, with x substituted by the picture QP value:

$$ChTableQp(x) = TableQp(x+g(x)) \text{ for each value.}$$

For Tab 1 to Tab 4, a1=−0.46, b1=9.26, S_C=1.14 for Tab 1, S_C=1.79 for Tab 2, S_C=1.04 for Tab3, and S_C=1.39 for Tab 4. Tab 0 may be a linear function where h(x)=x.

Note that in addition to this equation form, video encoder 200 and video decoder 300 may also apply rounding to g(x) and TableQP( ). For the tables in the disclosure, rounding was applied and TableQP( ) was used in the table form. In the ChTableQpLin( ) versions, rounded versions of g(x) and TableQP( ) may not be used.

Video encoder 200 and video decoder 300 may use baseQP as the base QP used to specify the encoder QP. The QP with which the luma value is coded in the picture is given as follows:

$$QP_{PIC} = baseQP + hierQPOffset$$

$$QP_Y = QP_{PIC}$$

where hierQPOffset is the QP offset applied to the picture in the hierarchical prediction structures, $QP_{Pic}$ is the picture QP, and $QP_Y$ is the luma QP. A deltaQP may also be defined as a QP offset that may be applied at the CU-level.

In some examples, the baseQP value is set equal to the QP used to encode an intra random access picture (TRAP). The chroma QP ($QP_C$) that is used to encode the picture of video data is calculated as follows:

$$cQP = QP_Y + chQPOffsetFixed + chQPOffset2(QP_{PIC})$$

$$QP_C = TableQP(cQP)$$

where chQPOffsetFixed a the fixed chroma QP offset applied to chroma components (e.g., at the picture-level/slice-level combined) and chQPOffset2( ) is the offset applied to chroma components that is derived from the one of the lookup tables 550 in FIG. 12, and TableQP( ) is a function used to derive the chroma QP (e.g., the table shown in FIG. 13).

Rather than using the table shown in FIG. 13 to derive the chroma QP value, video encoder 200 and video decoder 300 may also be configured to use a parametric function for obtaining the values similar to TableQp( ). In this example, video encoder 200 and video decoder 300 may derive TableQp(x) is derived as follows:

$$TableQP(x) = x, x < 29$$

$$29 + (8/14)*(x-29) \text{ for } 29 <= x <= 43$$

$$x - 6, x > 43$$

As can be seen from the foregoing, video encoder 200 and video decoder 300 may be configured to determine a picture QP ($QP_{PIC}$) value for a picture of video data. Video encoder 200 and video decoder 300 may be further configured to determine an intermediate chroma QP offset value (chQPOffset2) for a chroma QP ($QP_C$) value based on the picture QP value and a lookup table from multiple lookup tables (e.g., lookup tables 550 of FIG. 12), wherein the lookup table is based on video characteristics of the picture of video data. Video encoder 200 and video decoder 300 may be further configured to determine the chroma QP value as a function of the intermediate chroma QP offset value, and decode the picture of video data using the chroma QP value.

In some examples, $QP_{PIC}$ may be signalled as slice QP for luma and chQPOffsetFixed may be signalled as PPS chroma QP offset.

In some example, the luma DRA scale $S_Y[i]$ is applied to luma values in the i-th luma range. The chroma DRA scale is also derived for each range as follows:

$$S_{Ch}[i]=S_Y[i]*S_{corr}[i]$$

Where $S_{corr}[i]$ is the correction scale term applied to the i-th range, and derived as follows:

$$Qp1=baseQP+chQPOffsetFixed$$

$$Qp2=baseQP+chQPOffsetFixed-scale2QP(S_Y[i])$$

$$qpShift1=Qp1-TableQPLin(Qp1+chQPOffset2Lin(baseQP))$$

$$qpShift2=Qp2-TableQPLin(Qp2+chQPOffset2Lin(baseQP))$$

$$S_{corr}[i]=qp2Scale(qpShift2-qpShift1)$$

where TableQPLin( ) and chQPOffset2Lin( ) are linearized versions of TableQP( ) and chQPOffset2( ), respectively, and $qp2Scale(x)=2^{(x/6)}$ and $scale2QP(x)=6*\log_2(x)$.

In some examples, TableQPLin( ) and chQPOffset2Lin( ) are not linearized are set equal to TableQP( ) and chQPOffset2( ), respectively. The tables qp2Scale( ) and scale2QP( ) defined above are only examples. It is to be understood that the disclosure holds for other definition of these functions.

Example 2

In this example, the chroma offset term (e.g., chroma offset value) that is used to account for the gamut properties of the video data is handled by a chroma DRA scale value, and any variation arising due to the QP cascading is mitigated by the quantization table.

Let baseQP be the QP used to specify the encoder parameter. The QP with which the luma value is coded in the picture is given as follows:

$$QP_{PIC}=baseQP+hierQPOffset$$

$$QP_Y=QP_{PIC}$$

where hierQPOffset is the QP offset applied to the picture in the hierarchical prediction structures, and deltaQP is the QP offset applied at the CU-level. The chroma QP, $QP_C$, that is used to encode the video is calculated as follows:

$$cQP=QP_Y+chQPOffsetFixed+chQPOffset2(QP_{PIC})-chQPOffset2(baseQP)$$

$$QP_C=TableQP(cQP)$$

where chQPOffsetFixed is the fixed chroma QP offset applied (picture-level/slice-level combined) and chQPOffset2( ) is the offset derived from the table, and TableQP( ) is a function used to derive the chroma QP (e.g. derived from the table 560 in FIG. 13).

In some examples, $QP_{PIC}$ may be signalled as a slice QP for luma and chQPOffsetFixed may be signalled as a PPS chroma QP offset.

The luma DRA scale $S_Y[i]$ is applied to luma values in the i-th luma range. The chroma DRA scale is also derived for each range as follows:

$$S_{Ch}[i]=S_Y[i]*S_{corr}[i]*S_{CX}$$

where $S_{CX}$ is the scale derived using the gamut of the content (e.g. BT.709, P3), $S_{corr}[i]$ is the correction scale term applied to the i-th range, and derived as follows:

$$Qp1=baseQP+chQPOffsetFixed$$

$$Qp2=baseQP+chQPOffsetFixed+chQPOffset2Lin(baseQP)-scale2QP(S_Y[i])$$

$$qpShift1=Qp1-TableQPLin(Qp1)$$

$$qpShift2=Qp2-TableQPLin(Qp2)$$

$$S_{corr}[i]=qp2Scale(qpShift2-qpShift1).$$

TableQPLin( ) and chQPOffset2Lin( ) are linearized versions of TableQP( ) and chQPOffset2( ), respectively, and $qp2Scale(x)=2^{(x/6)}$ and $scale2QP(x)=6*\log_2(x)$.

In some examples, TableQPLin( ) and chQPOffset2Lin( ) are not linearized and are set equal to TableQP( ) and chQPOffset2( ), respectively. The tables qp2Scale( ) and scale2QP( ) defined above are only examples. It is to be understood that the disclosure holds for other definitions of these functions.

In another example, Qp2 is derived as follows:

$$Qp2=baseQP+chQPOffsetFixed-scale2QP(S_{CX})-scale2QP(S_Y[i])$$

In some examples, where the DRA function is also signalled at every frame, the derivation of $S_{corr}[i]$ may be modified to $QP_Y$ in the place of baseQP in parts of the derivation described above.

Example 3

In some examples, chroma QP value of the block being decoded can be derived as following:

$$QPcx=\text{fun3}(\text{first parameter set})+\text{fun4}(\text{second parameter})$$

$$\text{e.g., } QPcx=Table1(baseQP+QPpps+QPslice)+Table2(deltaQP)$$

where QPcx is a QP value to be applied for the currently processed chroma block (e.g. Cb or Cr), a first table may define a first derivation function for converting input QP values (baseQP+QPpps+QPslice) to an output value, similar to the Table 8-10 defined in HEVC, and a second table defines a second derivation function which takes a deltaQP value to obtain a QP offset which is applied to a block of luma samples associated with currently decoded chroma samples. In yet another examples, output QP value can be derived as:

$$QPcx=\text{fun3}((\text{first parameter set})*\text{fun4}(\text{second parameter}))$$

$$QPcx=\text{fun2}(\text{second parameter},\text{fun1}(\text{first parameter set}))$$

as similarly described above, where fun3( ) and fun4( ) also represent derivation from the first and second set of parameters. In another example, the QP value used to process the chroma block, QPcx, may be obtained as a composition of the two functions fun2( ) and fun1( ).

Example 4

In some examples, one or more of the processes discussed above, e.g., QP value derivation, can be applied on the block level, e.g., within a coding loop.

Figure 14:
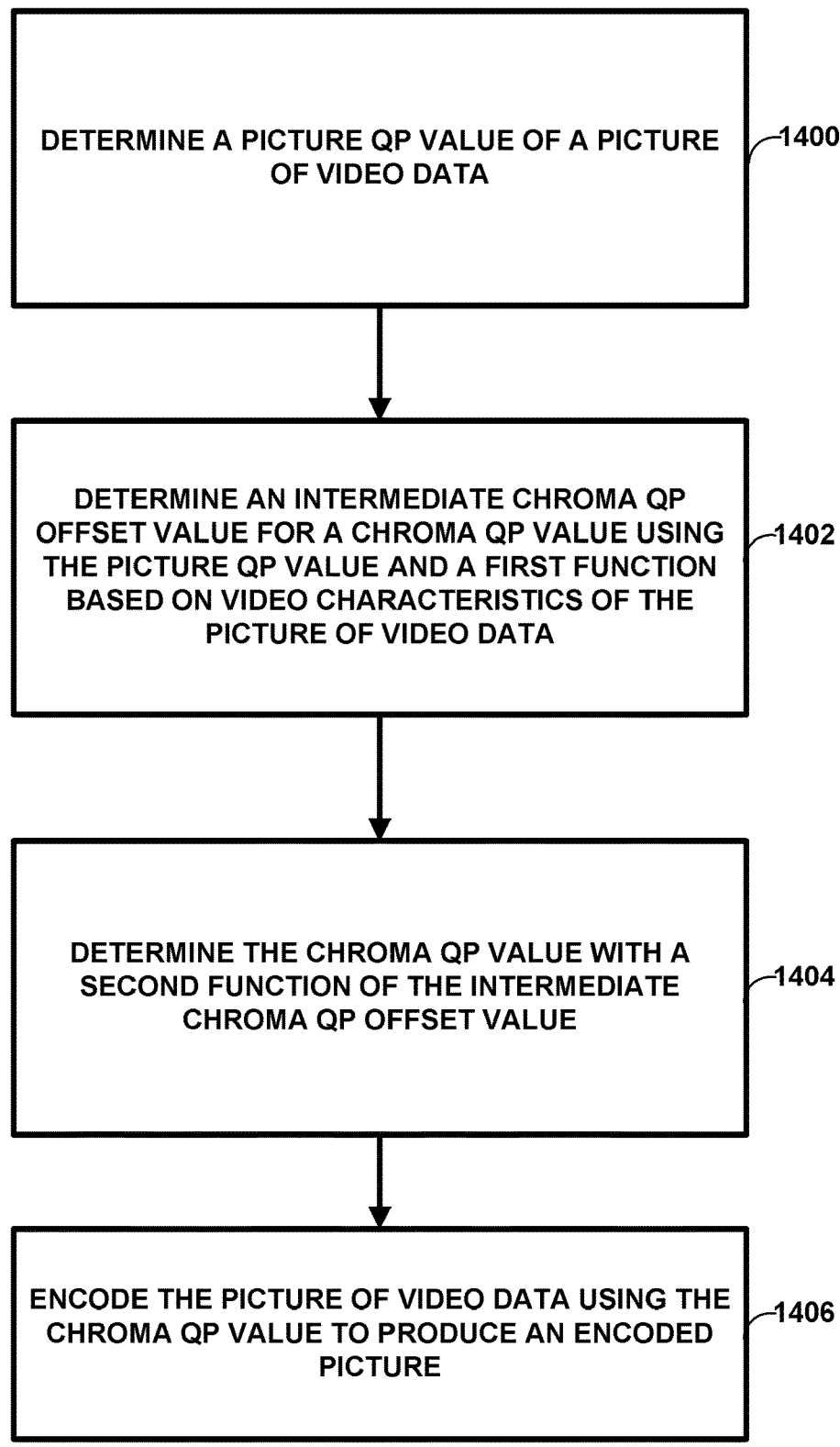
FIG. 14 is a flowchart illustrating an example encoding method according to the techniques of this disclosure.

FIG. 14 is a flowchart illustrating an example encoding method according to the techniques of this disclosure. In one example of the disclosure, video encoder 200 may be configured to determine a picture quantization parameter (QP) value of the picture of video data (1400), determine an intermediate chroma QP offset value for a chroma QP value using the picture QP value and a first function based on video characteristics of the picture of video data (1402), and determine the chroma QP value with a second function of the intermediate chroma QP offset value (1404). Video encoder 200 may be further configured to encode the picture of video data using the chroma QP value to produce an encoded picture (1406)

In one example, the first function is implemented as a lookup table from a plurality of lookup tables, wherein the picture QP value is an input to the lookup table, and wherein the lookup table is based on video characteristics of the picture of video data. In one example, the video characteristics of the picture of video data includes one or more of a color component, a color gamut, or a color space.

In another example of the disclosure, video encoder 200 is further configured to determine the picture QP value based on a base QP value and a hierarchical QP offset value, wherein to determine the intermediate chroma QP offset value for the chroma QP value, video encoder 200 is further configured to determine the intermediate chroma QP offset value for the chroma QP value based on the picture QP value and the lookup table.

In another example of the disclosure, to determine the chroma QP value as the second function of the intermediate chroma QP offset value, video encoder 200 is further configured to determine the chroma QP value based on the picture QP value, the intermediate chroma QP offset value, and a fixed chroma QP offset value.

In another example of the disclosure, to determine the intermediate chroma QP offset value, video encoder 200 is further configured to determine a first intermediate chroma QP offset value for the chroma QP value based on the base QP value and the lookup table, and determine a second intermediate chroma QP offset value for the chroma QP value based on the picture QP value and the lookup table.

In another example of the disclosure, to determine the chroma QP value as the second function of the intermediate chroma QP offset value, video encoder 200 is further configured to determine the chroma QP value based on the picture QP value, the first intermediate chroma QP offset value, the second intermediate chroma QP offset value, and a fixed chroma QP offset value.

In another example of the disclosure, video encoder 200 is further configured to determine the lookup table from the plurality of lookup tables based on one or more of a chroma color component or a color gamut of the picture.

Figure 15:
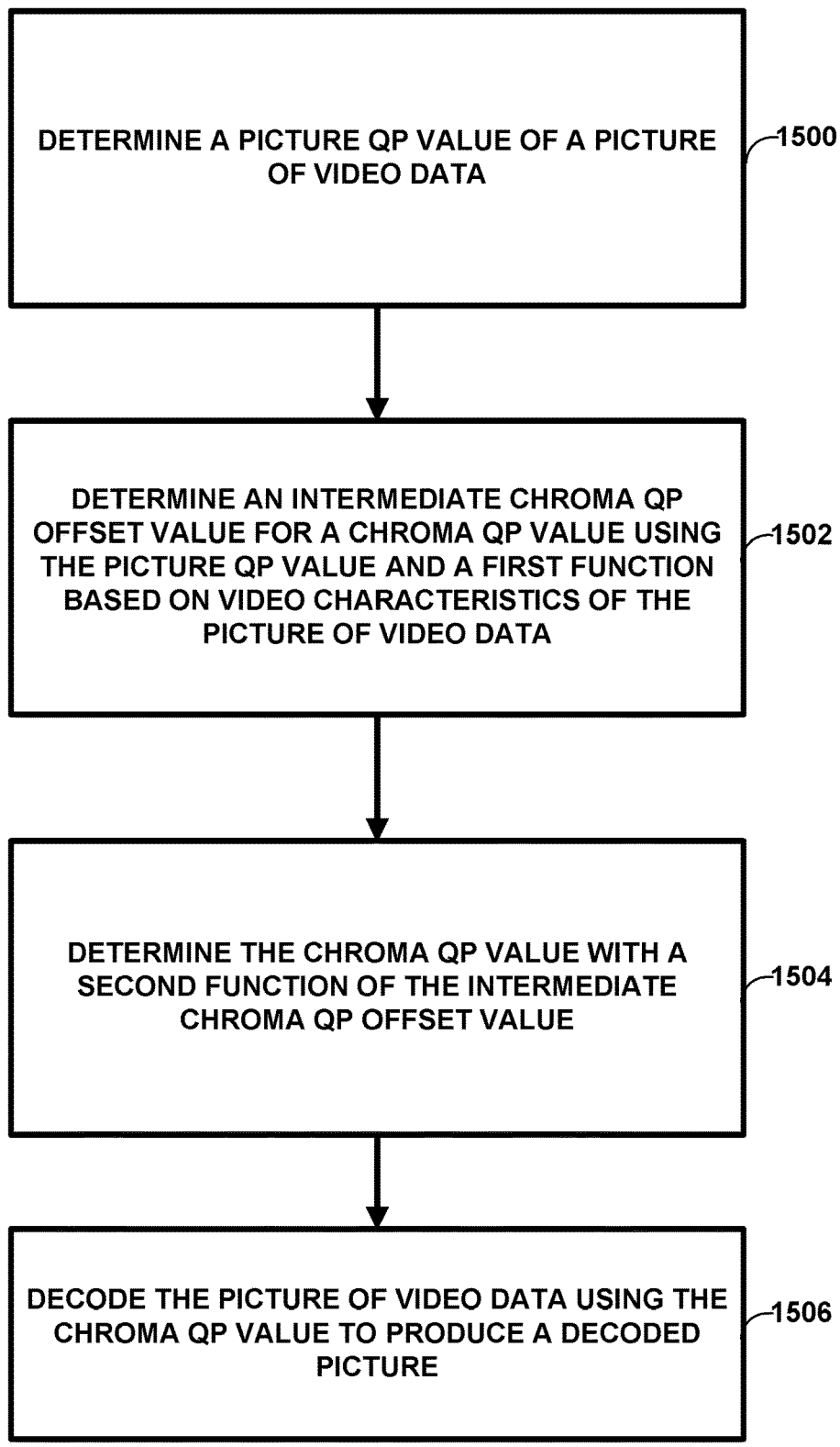
FIG. 15 is a flowchart illustrating an example decoding method according to the techniques of this disclosure.

FIG. 15 is a flowchart illustrating an example decoding method according to the techniques of this disclosure. In one example of the disclosure, video decoder 300 may be configured to determine a picture quantization parameter (QP) value of the picture of video data (1500), determine an intermediate chroma QP offset value for a chroma QP value using the picture QP value and a first function based on video characteristics of the picture of video data (1502), and determine the chroma QP value with a second function of the intermediate chroma QP offset value (1504). Video decoder 300 may be further configured to decode the picture of video data using the chroma QP value to produce a decoded picture (1506)

In one example, the first function is implemented as a lookup table from a plurality of lookup tables, wherein the picture QP value is an input to the lookup table, and wherein the lookup table is based on video characteristics of the picture of video data. In one example, the video characteristics of the picture of video data includes one or more of a color component, a color gamut, or a color space.

In another example of the disclosure, video decoder 300 is further configured to determine the picture QP value based on a base QP value and a hierarchical QP offset value, wherein to determine the intermediate chroma QP offset value for the chroma QP value, video decoder 300 is further configured to determine the intermediate chroma QP offset value for the chroma QP value based on the picture QP value and the lookup table.

In another example of the disclosure, to determine the chroma QP value as the second function of the intermediate chroma QP offset value, video decoder 300 is further configured to determine the chroma QP value based on the picture QP value, the intermediate chroma QP offset value, and a fixed chroma QP offset value.

In another example of the disclosure, to determine the intermediate chroma QP offset value, video decoder 300 is further configured to determine a first intermediate chroma QP offset value for the chroma QP value based on the base QP value and the lookup table, and determine a second intermediate chroma QP offset value for the chroma QP value based on the picture QP value and the lookup table.

In another example of the disclosure, to determine the chroma QP value as the second function of the intermediate chroma QP offset value, video decoder 300 is further configured to determine the chroma QP value based on the picture QP value, the first intermediate chroma QP offset value, the second intermediate chroma QP offset value, and a fixed chroma QP offset value.

In another example of the disclosure, video decoder 300 is further configured to determine the lookup table from the plurality of lookup tables based on one or more of a chroma color component or a color gamut of the picture.

In another example of the disclosure, video decoder 300 is further configured to determine the lookup table from the plurality of lookup tables based on a syntax element received in an encoded video bitstream.

In another example of the disclosure, video decoder 300 is further configured to determine a luma scale value for dynamic range adjustment, determine a chroma scale value for dynamic range adjustment as a third function a base QP value, a fixed chroma QP offset value, the luma scale value, and a linearized version of the intermediate chroma QP offset value, and perform a dynamic range adjustment on the decoded picture using the luma scale value and the chroma scale value.

In another example of the disclosure, video decoder 300 is further configured to determine a luma scale value for dynamic range adjustment, determine a chroma scale value for dynamic range adjustment as a third function a base QP value, a fixed chroma QP offset value, the luma scale value, a color gamut of the picture, and a linearized version of the intermediate chroma QP offset value, and perform a dynamic range adjustment on the decoded picture using the luma scale value and the chroma scale value.

In another example of the disclosure, to determine the intermediate chroma QP offset value, video decoder 300 is further configured to determine the intermediate chroma QP offset value for the chroma QP value based on a base QP value, and one or more of a QP value from a picture parameter set, and a QP value from a slice header.

In another example of the disclosure, video decoder 300 is further configured to output the decoded picture for display.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding a picture of video data, the method comprising:
    deriving a lookup table for determining a chroma quantization parameter (QP) value, including:
        receiving one or more input QP values of the lookup table and one or more delta values in an encoded video bitstream, wherein each input QP value corresponds to a delta value of the one or more delta values; and
        determining one or more output QP values of the lookup table based on an input QP value of the one or more input QP values and a corresponding delta value of the one or more delta values;
    determining a luma QP value of the picture of video data;
    determining a chroma QP value using the lookup table and the luma QP value, wherein the luma QP value is an input to the lookup table; and
    decoding the picture of video data using the chroma QP value to produce a decoded picture.

2. The method of claim 1, wherein the lookup table is based on video characteristics of the picture of video data, and wherein determining the chroma QP value using the lookup table and the luma QP value comprises:
    determining an intermediate chroma QP offset value for the chroma QP value using the luma QP value and the lookup table; and
    determining the chroma QP value with a function of the intermediate chroma QP offset value.

3. The method of claim 2, wherein the video characteristics of the picture of video data includes one or more of a color component, a color gamut, or a color space.

4. The method of claim 2, wherein the luma QP value is a picture QP value, the method further comprising:
    determining the picture QP value based on a base QP value and a hierarchical QP offset value,
    wherein determining the intermediate chroma QP offset value for the chroma QP value comprises determining the intermediate chroma QP offset value for the chroma QP value based on the picture QP value and the lookup table.

5. The method of claim 4, wherein determining the chroma QP value as the function of the intermediate chroma QP offset value comprises:
    determining the chroma QP value based on the picture QP value, the intermediate chroma QP offset value, and a fixed chroma QP offset value.

6. The method of claim 4, wherein determining the intermediate chroma QP offset value comprises:

determining a first intermediate chroma QP offset value for the chroma QP value based on the base QP value and the lookup table; and determining a second intermediate chroma QP offset value for the chroma QP value based on the picture QP value and the lookup table.

7. The method of claim 6, wherein determining the chroma QP value as the function of the intermediate chroma QP offset value comprises:

determining the chroma QP value based on the picture QP value, the first intermediate chroma QP offset value, the second intermediate chroma QP offset value, and a fixed chroma QP offset value.

8. The method of claim 2, further comprising:

determining a luma scale value for dynamic range adjustment;

determining a chroma scale value for dynamic range adjustment as a function of a base QP value, a fixed chroma QP offset value, the luma scale value, and a linearized version of the intermediate chroma QP offset value; and performing a dynamic range adjustment on the decoded picture using the luma scale value and the chroma scale value.

9. The method of claim 2, further comprising:

determining a luma scale value for dynamic range adjustment;

determining a chroma scale value for dynamic range adjustment as a function of a base QP value, a fixed chroma QP offset value, the luma scale value, a color gamut of the picture, and a linearized version of the intermediate chroma QP offset value; and performing a dynamic range adjustment on the decoded picture using the luma scale value and the chroma scale value.

10. The method of claim 2, wherein determining the intermediate chroma QP offset value comprises determining the intermediate chroma QP offset value for the chroma QP value based on a base QP value, and one or more of a QP value from a picture parameter set, and a QP value from a slice header.

11. The method of claim 1, further comprising:

outputting the decoded picture for display.

12. An apparatus configured to decode video data, the apparatus comprising:

a memory configured to store a picture of video data; and one or more processors in communication with the memory, the one or more processors configured to:

derive a lookup table for determining a chroma quantization parameter (QP) value, wherein to derive the lookup table the one or more processors are further configured to:

receive one or more input QP values of the lookup table and one or more delta values in an encoded video bitstream, wherein each input QP value corresponds to a delta value of the one or more delta values; and determine one or more output QP values of the lookup table based on an input QP value of the one or more input QP values and a corresponding delta value of the one or more delta values;

determine a luma QP value of the picture of video data;

determine a chroma QP value using the lookup table and the luma QP value, wherein the luma QP value is an input to the lookup table; and decode the picture of video data using the chroma QP value to produce a decoded picture.

13. The apparatus of claim 12, wherein the lookup table is based on video characteristics of the picture of video data, and wherein to determine the chroma QP value using the lookup table and the luma QP value, the one or more processors are further configured to:

determine an intermediate chroma QP offset value for the chroma QP value using the luma QP value and the lookup table; and determine the chroma QP value with a function of the intermediate chroma QP offset value.

14. The apparatus of claim 13, wherein the video characteristics of the picture of video data includes one or more of a color component, a color gamut, or a color space.

15. The apparatus of claim 13, wherein the luma QP value is a picture QP value, and wherein the one or more processors are further configured to:

determine the picture QP value based on a base QP value and a hierarchical QP offset value, wherein to determine the intermediate chroma QP offset value for the chroma QP value, the one or more processors are further configured to determine the intermediate chroma QP offset value for the chroma QP value based on the picture QP value and the lookup table.

16. The apparatus of claim 15, wherein to determine the chroma QP value as the function of the intermediate chroma QP offset value, the one or more processors are further configured to:

determine the chroma QP value based on the picture QP value, the intermediate chroma QP offset value, and a fixed chroma QP offset value.

17. The apparatus of claim 15, wherein to determine the intermediate chroma QP offset value, the one or more processors are further configured to:

determine a first intermediate chroma QP offset value for the chroma QP value based on the base QP value and the lookup table; and determine a second intermediate chroma QP offset value for the chroma QP value based on the picture QP value and the lookup table.

18. The apparatus of claim 17, wherein to determine the chroma QP value as the function of the intermediate chroma QP offset value, the one or more processors are further configured to:

determine the chroma QP value based on the picture QP value, the first intermediate chroma QP offset value, the second intermediate chroma QP offset value, and a fixed chroma QP offset value.

19. The apparatus of claim 13, wherein the one or more processors are further configured to:

determine a luma scale value for dynamic range adjustment;

determine a chroma scale value for dynamic range adjustment as a function of a base QP value, a fixed chroma QP offset value, the luma scale value, and a linearized version of the intermediate chroma QP offset value; and perform a dynamic range adjustment on the decoded picture using the luma scale value and the chroma scale value.

20. The apparatus of claim 13, wherein the one or more processors are further configured to:

determine a luma scale value for dynamic range adjustment;

determine a chroma scale value for dynamic range adjustment as a function of a base QP value, a fixed chroma QP offset value, the luma scale value, a color gamut of the picture, and a linearized version of the intermediate chroma QP offset value; and perform a dynamic range adjustment on the decoded picture using the luma scale value and the chroma scale value.

21. The apparatus of claim 13, wherein to determine the intermediate chroma QP offset value, the one or more processors are further configured to determine the intermediate chroma QP offset value for the chroma QP value based on a base QP value, and one or more of a QP value from a picture parameter set, and a QP value from a slice header.

22. The apparatus of claim 12, wherein the one or more processors are further configured to:

output the decoded picture for display.

23. An apparatus configured to decode video data, the apparatus comprising:

means for deriving a lookup table for determining a chroma quantization parameter (QP) value in an encoded video bitstream, wherein the means for deriving the lookup table comprise:

means for receiving one or more input QP values of the lookup table and one or more delta values in an encoded video bitstream, wherein each input QP value corresponds to a delta value of the one or more delta values; and means for determining one or more output QP values of the lookup table based on an input QP value of the one or more input QP values and a corresponding delta value of the one or more delta values;

means for determining a luma QP value of the picture of video data;

means for determining a chroma QP value using the lookup table and the luma QP value, wherein the luma QP value is an input to the lookup table; and means for decoding the picture of video data using the chroma QP value to produce a decoded picture.

24. The apparatus of claim 23, wherein the lookup table is based on video characteristics of the picture of video data, and wherein the means for determining the chroma QP value using the lookup table and the luma QP value comprises:

means for determining an intermediate chroma QP offset value for the chroma QP value using the luma QP value and the lookup table; and means for determining the chroma QP value with a function of the intermediate chroma QP offset value.

25. A non-transitory computer-readable storage medium storing instructions that, when executed, cause one or more processors of a device configured to decode video data to:

derive a lookup table for determining a chroma quantization parameter (QP) value, wherein to derive the lookup table the one or more processors are further configured to:

receive one or more input QP values of the lookup table and one or more delta values in an encoded video bitstream, wherein each input QP value corresponds to a delta value of the one or more delta values;

determine one or more output QP values of the lookup table based on an input QP value of the one or more input QP values and a corresponding delta value of the one or more delta values;

determine a luma QP value of the picture of video data;

determine a chroma QP value using the lookup table and the luma QP value, wherein the luma QP value is an input to the lookup table; and decode the picture of video data using the chroma QP value to produce a decoded picture.

26. The non-transitory computer-readable storage medium of claim 25, wherein the lookup table is based on video characteristics of the picture of video data, and wherein to determine the chroma QP value using the lookup table and the luma QP value, the instructions further cause the one or more processors to:

determine an intermediate chroma QP offset value for the chroma QP value using the luma QP value and the lookup table; and determine the chroma QP value with a function of the intermediate chroma QP offset value.

27. The method of claim 1, wherein the one or more input QP values comprises one or more picture QP values.

28. The apparatus of claim 12, wherein the one or more input QP values comprises one or more picture QP values.

29. The apparatus of claim 23, wherein the one or more input QP values comprises one or more picture QP values.

30. The non-transitory computer-readable storage medium of claim 25, wherein the one or more input QP values comprises one or more picture QP values.

* * * * *